United States Patent
Tonomura et al.

(10) Patent No.: US 8,549,907 B2
(45) Date of Patent: Oct. 8, 2013

(54) FLUID DISTRIBUTION DEVICE, MICRO PLANT, METHOD OF DESIGNING FLUID DISTRIBUTION DEVICE, AND METHOD OF DETECTING BLOCKAGE OF FLOW CHANNEL

(75) Inventors: Osamu Tonomura, Kyoto (JP); Satoshi Nagahara, Yokohama (JP); Manabu Kano, Kyoto (JP); Shinji Hasebe, Kyoto (JP)

(73) Assignee: Kyoto University, Kyoto (JP)

( * ) Notice: Subject to any disclaimer, the term of this patent is extended or adjusted under 35 U.S.C. 154(b) by 378 days.

(21) Appl. No.: 12/935,446

(22) PCT Filed: Mar. 26, 2009

(86) PCT No.: PCT/JP2009/056106
§ 371 (c)(1),
(2), (4) Date: Sep. 29, 2010

(87) PCT Pub. No.: WO2009/123009
PCT Pub. Date: Oct. 8, 2009

(65) Prior Publication Data
US 2011/0016967 A1    Jan. 27, 2011

(30) Foreign Application Priority Data
Mar. 31, 2008   (JP) .................................. 2008-093480

(51) Int. Cl.
*G01F 7/00* (2006.01)
*G01F 1/00* (2006.01)

(52) U.S. Cl.
USPC ........................... 73/196; 73/861; 137/561 R

(58) Field of Classification Search
None
See application file for complete search history.

(56) References Cited

FOREIGN PATENT DOCUMENTS

| | | |
|---|---|---|
| JP | 2006-223967 | 8/2006 |
| JP | 2006-227853 | 8/2006 |
| JP | 2007-50340 | 3/2007 |
| JP | 2007-260569 | 10/2007 |
| JP | 2011180992 A * | 9/2011 |

OTHER PUBLICATIONS

Osamu Tonomura et al.; "Optimal Shape Design and Operation of Microreactors"; 9 Pages, Jul. 14, 2005.
Japanes Patent Office; Search Report in International Patent Application No. PCT/JP2009/056106 dated May 26, 2009; 4 pages.

* cited by examiner

*Primary Examiner* — Harshad R Patel
(74) *Attorney, Agent, or Firm* — Wood, Herron & Evans, LLP

(57) ABSTRACT

The present invention provides a fluid distribution device for uniformly distributing and outputting a fluid, which is supplied to an input flow channel, into at least three output flow channels, comprising a plurality of branch flow channels, at least three fluid bifurcation portions, and at least one fluid converging portion, wherein the fluid distribution device is configured to correspond to a pressure drop compartment connection model composed of a fluid balance equation and a pressure balance equation. Furthermore, the present invention provides a micro plant using the fluid distribution device, a method of designing the fluid distribution device and a method of detecting blockage of flow channels of the fluid distribution device.

11 Claims, 13 Drawing Sheets

(FLOW CHANNEL MODEL)

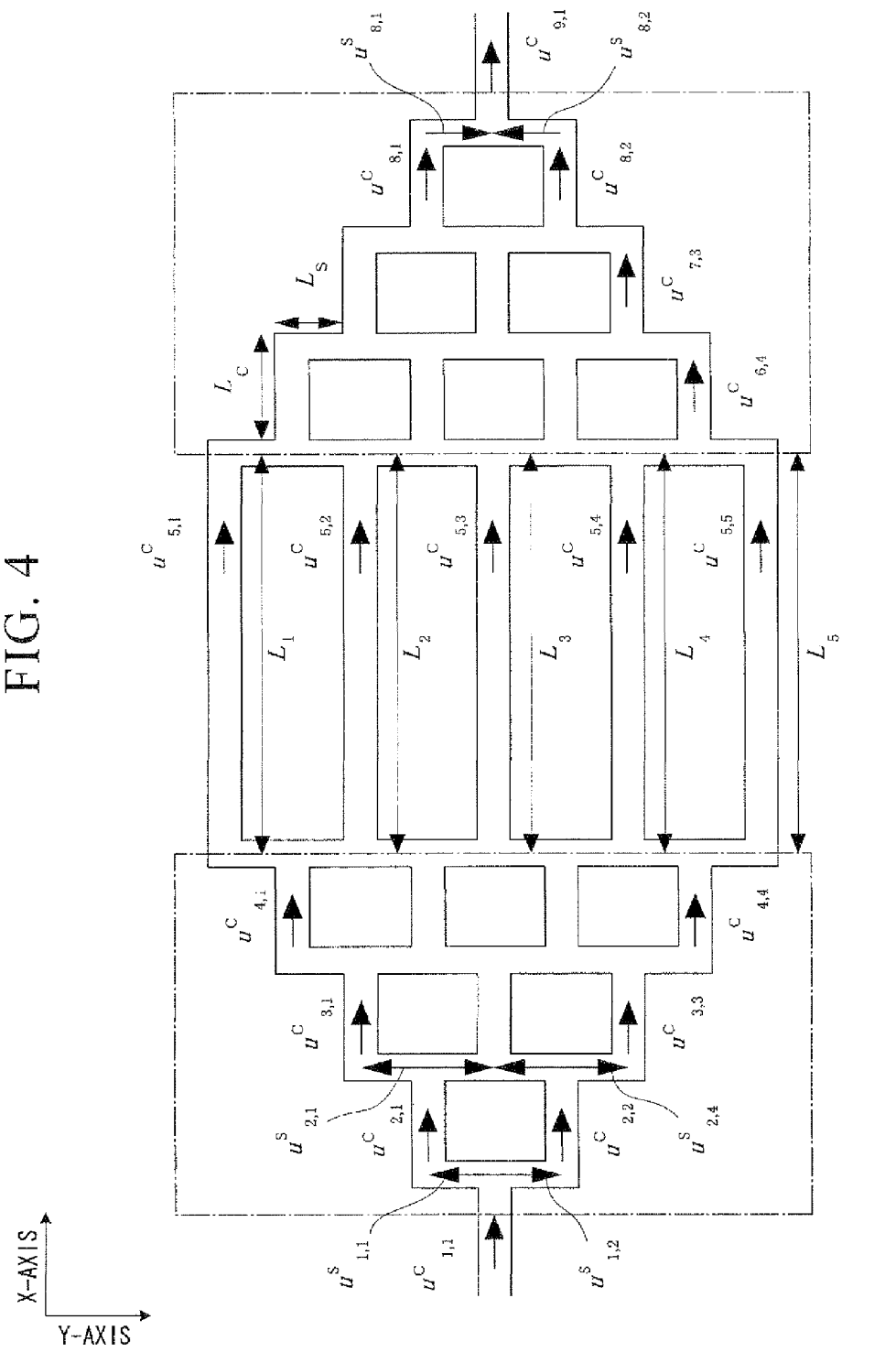
FIG. 4 (DESIGN MODEL)

US 8,549,907 B2

FLUID DISTRIBUTION DEVICE, MICRO PLANT, METHOD OF DESIGNING FLUID DISTRIBUTION DEVICE, AND METHOD OF DETECTING BLOCKAGE OF FLOW CHANNEL

FIELD OF THE INVENTION

The present invention relates to a fluid distribution device, a micro plant, a method of designing the fluid distribution device, and a method of detecting blockage of flow channels.

Priority is claimed on Japanese Patent Application No. 2008-093480, filed Mar. 31, 2008, the content of which is incorporated herein by reference.

BACKGROUND ART

Micro chemical processes are realized in a small space by connecting micron-order processing devices (micro processing device) through micron-order flow channels (micro flow channels). Such micro chemical processes employ a technique for increasing the processing amount, which is referred to as numbering-up, i.e., a structure in which a plurality of micro processing devices are disposed in parallel, a processing fluid is supplied to each of the micro processing devices through a plurality of micro flow channels (parallel flow channels), and the processed fluid is collected from each of the micro processing devices through the parallel flow channels.

For example, the following Patent Document 1 discloses a fluid distribution technique of micro flow channels in the numbering-up structure, in which a valve and a flow rate sensor are installed at each of the micro flow channels to regulate a flow rate of each of the micro flow channels.

In addition, the following Patent Document 2 discloses a fluid mixing device of the numbering-up structure, in which, after a plurality of fluids are rectified in annular flow channels installed to correspond to the fluids, each fluid is distributed into a plurality of distribution flow channels, and each fluid is uniformly distributed by installing a pressure drop means on each distribution flow channel.

[Patent Document 1] Japanese Unexamined Patent Application Publication No. 2006-227853
[Patent Document 2] Japanese Unexamined Patent Application Publication No. 2007-260569

DISCLOSURE OF THE INVENTION

Problems to be Solved by the Invention

In the related art mentioned above, the structure for achieving the uniform distribution of each fluid is complicated, and thus leaves room for improvement. That is, in the micro chemical processes, since the micro processing devices and the micro flow channels are installed in a small space, when the flow channel has a complicated shape or when a residence area of fluid such as the valve or the pressure drop means is formed in the flow channel, the possibility of blockage the flow channel is increased. In addition, since a micro measurement device such as the flow sensor forms the residence area of fluid such as the valve or the pressure drop means, the measurement device becomes a cause of the flow channel blockage and incurs high cost.

The present invention has been proposed in view of the above-mentioned problems and for the purpose of the following aspects.

(1) Uniform distribution of fluid can be achieved by a simple structure, thereby preventing a flow channels from becoming blocked.
(2) Blockage of parallel flow channels is detected using a smaller number of measurement devices than the related art.
(3) A blocked flow channel is specified.
(4) A blocked state (or a blockage level) of the blocked flow channel is detected.

Means for Solving the Problems

In order to accomplish the above-mentioned objects, as a first aspect of a fluid distribution device, the present invention provides a fluid distribution device for uniformly distributing and outputting a fluid, which is supplied to an input flow channel, into at least three output flow channels, including a plurality of branch flow channels, at least three fluid bifurcation portions and at least one fluid converging portion, wherein the fluid distribution device is configured to correspond to a pressure drop compartment connection model composed of a fluid balance equations and a pressure balance equations.

As a second aspect of the fluid distribution device according to the first aspect of the fluid distribution device, the fluid distribution device further include a monitoring device for monitoring blockage of the output flow channels and two flow meters installed at two arbitrary output flow channels of each of the output flow channels. The monitoring device perform a pre-process of acquiring values measured by the flow meters as a standard flow rate in a state in which there is no blockage in the entire output flow channels, acquiring values measured by the flow meters as a reference flow rate when the output flow channels in which the flow meters are not installed are blocked, and storing the ratio of the difference between the standard flow rate and the reference flow rate of one flow meter and the difference between the standard flow rate and the reference flow rate of the other flow meter as a standard flow rate variation ratio. During an operation after the pre-process, the monitoring device may acquire values measured by the flow meters as an initial flow rate right after the operation starts, then acquire values measured by the flow meters as an estimation flow rate in the operation after the acquisition, and calculate the ratio of the difference between the initial flow rate and the estimation flow rate of one flow meter and the difference between the initial flow rate and the estimation flow rate of the other flow meter as a flow rate variation ratio upon operation to specify a blocked output flow channel based on a comparison of the flow rate variation ratio upon operation with the standard flow rate variation ratio.

As a third aspect of the fluid distribution device according to the first or second aspect of the fluid distribution device, the monitoring device performs a pre-process of acquiring values of the flow meters as a standard flow rate in a state in which there is no blockage in the entire output flow channels, all of which installed with flow meters, sequentially acquiring values measured by the flow meters as a reference flow rate when the output flow channels are sequentially blocked, and storing the ratio of the difference between the standard flow rate and the reference flow rate of each flow meter and the difference between the standard flow rate and the reference flow rate of the other flow meter as a standard flow rate variation ratio. During an operation after the pre-process, the monitoring device may acquire values measured by the flow meters as an initial flow rate right after the operation starts, then acquires values measured by the flow meters as an estimation flow rate after the acquisition, and detect blockage levels of the output flow channels based on the product of a flow rate variation rate and the standard flow rate variation ratio, the flow rate variation rate being obtained from the initial flow rate and the estimation flow rate.

As a fourth aspect of the fluid distribution device according to the third aspect of the fluid distribution device, the monitoring device of the third means may detect a blockage level of the blocked output flow channel when the blocked output flow channel is specified.

As a fifth aspect of the fluid distribution device according the first aspect of the fluid distribution device, the fluid distribution device of one of the first to fourth means may be finely configured for the use of a micro plant having a numbering-up structure.

In addition, as a first aspect of a micro plant, the present invention provides a micro plant, which uniformly distributes a processing fluid into each micro processing device through the fluid distribution device according to the fifth aspect of the fluid distribution device.

Further, as a first aspect of method of designing a fluid distribution device for uniformly distributing and outputting a fluid, the present invention provides a method of designing a fluid distribution device for uniformly distributing and outputting a fluid, which is input into an input flow channel, into at least three output flow channels, including designing the fluid distribution device with a configuration including at least three fluid bifurcation portions and at least one fluid converging portion by combining a plurality of branch flow channels, and applying a pressure drop compartment connection model composed of a fluid balance equations and a pressure balance equations is applied to the fluid distribution device.

Furthermore, as a first aspect of a method of detecting blockage of flow channels, the present invention provides a method of detecting blockage of flow channels of a fluid distribution device designed by the first aspect of the design method of the fluid distribution device, including a pre-process of acquiring flow rates of two arbitrary output flow channels as a standard flow rate in a state in which there is no blockage in the entire output flow channels, acquiring flow rates of the two output flow channels as a reference flow rate when the output flow channels other than the two output flow channels are blocked, and storing the ratio of the difference between the standard flow rate and the reference flow rate of a flow meter installed at one of the two output flow channels and the difference between the standard flow rate and the reference flow rate of a flow meter installed at the other flow channel as a standard flow rate variation ratio. During an operation after the pre-process, the fluid distribution device acquires flow rates of the two output flow channels as an initial flow rate right after the operation of the fluid distribution device starts, then acquires flow rates of the two output flow channels as an estimation flow rate in the operation after the acquisition, and calculates the ratio of the difference between an initial flow rate and an estimation flow rate of a flow meter installed at one of the two output flow channels and the difference between an initial flow rate and an estimation flow rate of a flow meter installed at the other flow channel as a flow rate variation ratio upon operation to specify the blocked output flow channel based on a comparison of the flow rate variation ratio upon operation with the standard flow rate variation ratio.

As a second aspect of a method of detecting blockage of flow channels, the present invention provides a method of detecting blockage of flow channels of a fluid distribution device designed by the first aspect of the design method of the fluid distribution device, including a pre-process of acquiring flow rates of the entire output flow channels as a standard flow rate in a state in which there is no blockage in the entire output flow channels, acquiring flow rates of the entire output flow channels as a reference flow rate when the output flow channels are sequentially blocked, and storing the ratio of the difference between the standard flow rate and the reference flow rate of each output flow channel and the difference between the standard flow rate and the reference flow rate of the other output flow channel as a standard flow rate variation ratio, and during an operation after the pre-process, acquiring flow rates of two arbitrary output flow channels as an initial flow rate right after the operation of the fluid distribution device starts, then acquiring flow rates of the two output flow channels as an estimation flow rate in the operation after the acquisition, and detecting a blockage level of the output flow channels based on the product of a flow rate variation rate and the standard flow rate variation ratio, the flow rate variation rate being obtained from the initial flow rate and the estimation flow rate.

As a third aspect of a method of detecting blockage of flow channels, the present invention provides a method of detecting blockage of flow channels, which is applied to the fluid distribution device finely configured for the use of a micro plant having a numbering-up structure.

Effect of the Invention

According to the present invention, since the fluid distribution device is constituted by combining a plurality of branch flow channels, includes at least three fluid bifurcation portions and at least one fluid converging portion, and is configured to correspond to a pressure drop compartment connection model composed of a fluid balance equations and a pressure balance equations, the fluid can be uniformly distributed using a simpler structure than the conventional art. Therefore, since a stay portion of the fluid can be reduced more than the conventional art, it is possible to prevent the flow channels from being blocked. In addition, it is possible to reduce costs by simplifying the structure.

Further, according to the present invention, since which one of at least three output flow channels which is blocked is detected based on flow rates of two arbitrary output flow channels during an operation, it is possible to specify the blockage of the output flow channel using a smaller number of measurement devices than that of the conventional art.

Furthermore, according to the present invention, since blockage levels of at least three output flow channels are detected based on flow rates of two arbitrary output flow channels during an operation, it is possible to detect a blocked state (or a blockage level) of the blocked flow channel using a smaller number of measurement devices than that of the conventional art.

BRIEF DESCRIPTION OF THE DRAWINGS

FIG. 4 shows a flow channel model for applying a pressure drop compartment (PDC) connection model of the embodiment of the present invention to design of the micro fluid distribution device M.

DESCRIPTION OF REFERENCE NUMERALS

Figure 1:
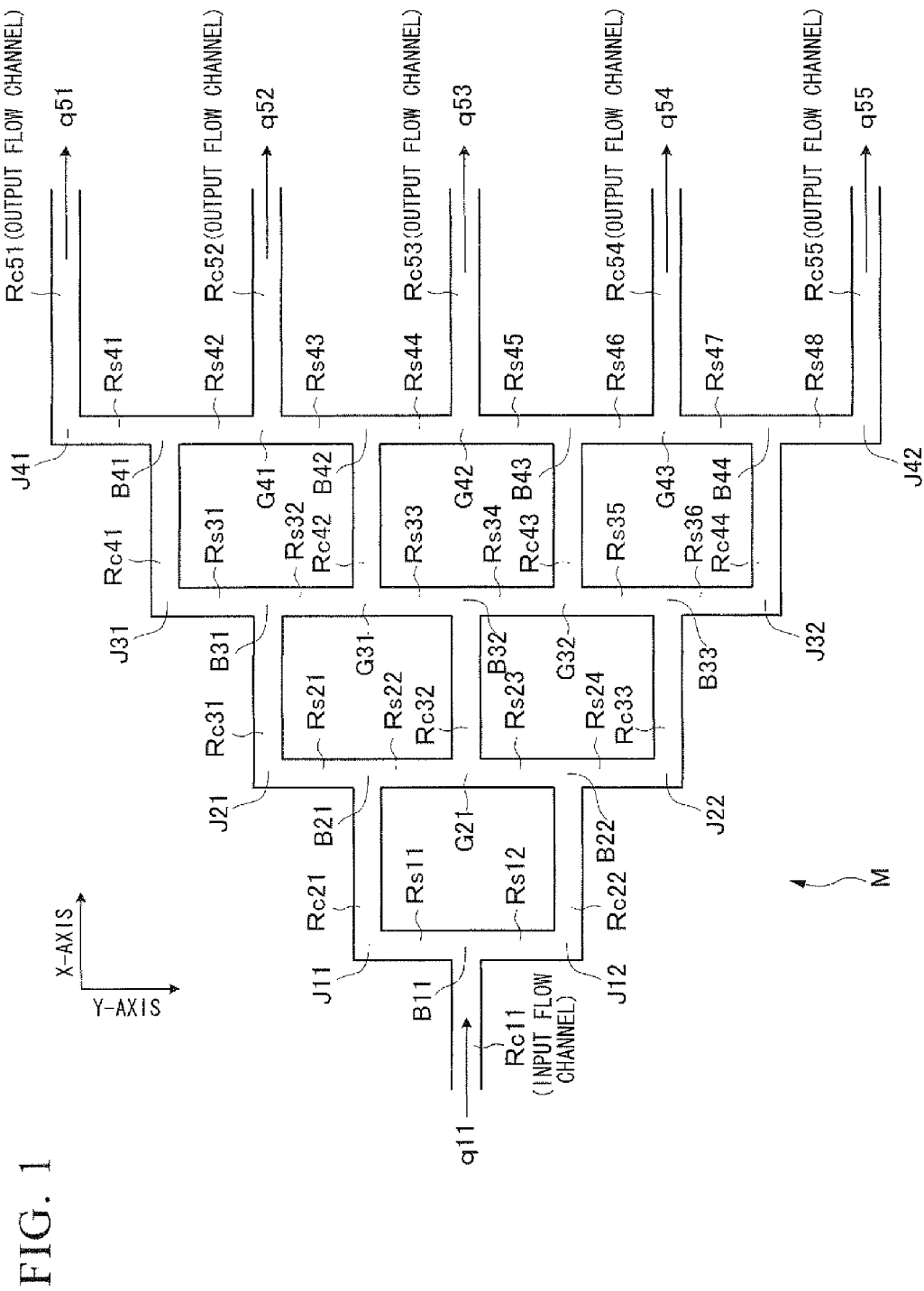
FIG. 1 is a plan view showing a two-dimensional constitution of a micro fluid distribution device M in accordance with an embodiment of the present invention.

M: Micro fluid distribution device
Rc11: Input micro flow channel
Rc21 to Rc44, Rs11 to Rs48: Branch micro flow channels
Rc51 to Rc55: Output micro flow channels
B11 to B44: Fluid bifurcation portions
G21 to G43: Fluid junction portions
W: Processing Fluid
P: Micro plant
1: Micro supply tank
2: Micro pump
RA1 to RA5: Micro process devices
4: Micro fluid collection device
5: Micro collection tank
FM1, FM5: Micro flow meters
6: Monitoring device

BEST MODE FOR CARRYING OUT THE INVENTION

Hereinafter, embodiments of the present invention will be described with reference to the accompanying drawings.

Figure 2:
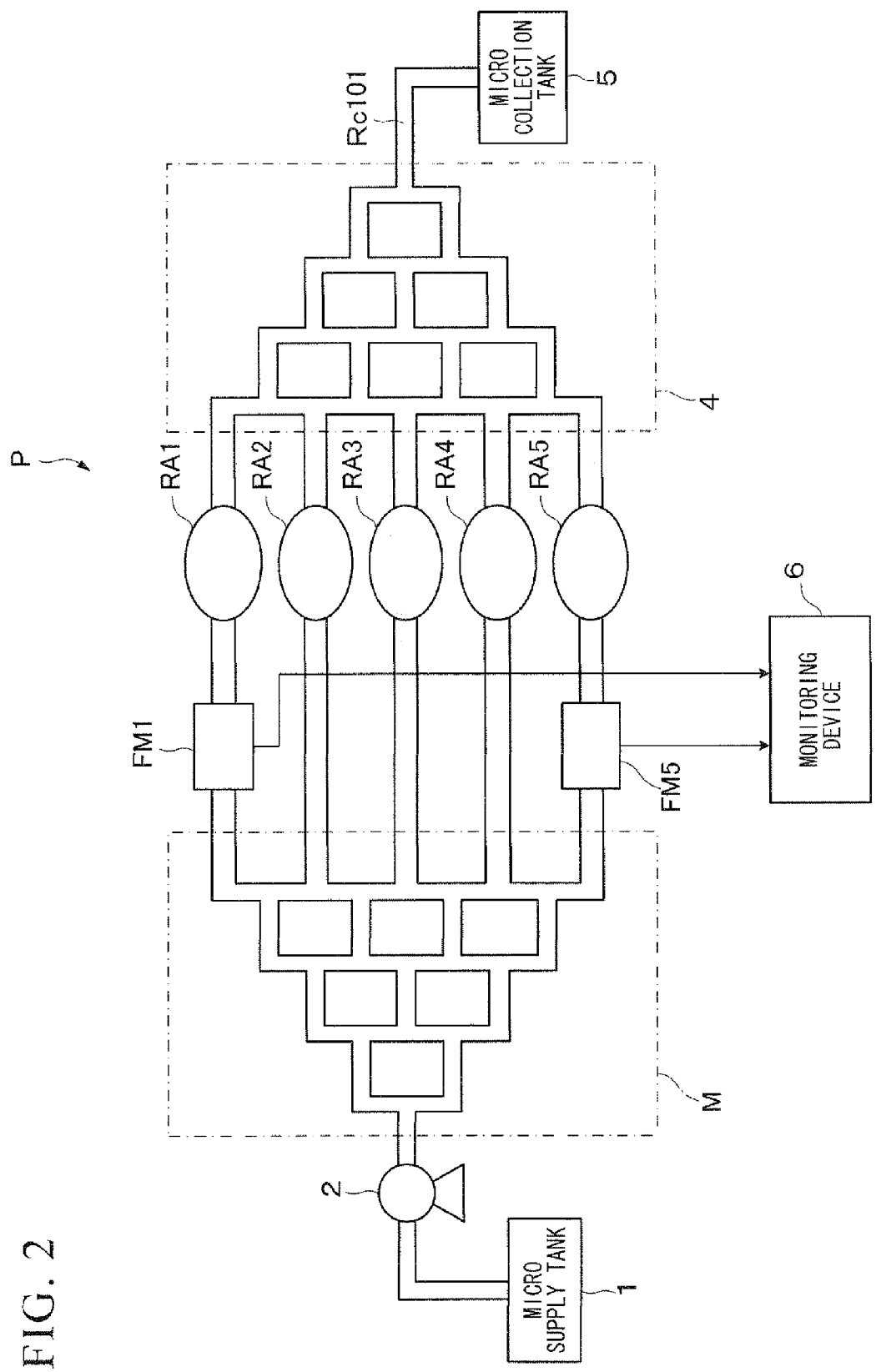
FIG. 2 is a view showing the constitution of a micro plant P using the micro fluid distribution device in accordance with the embodiment of the present invention.

FIG. 1 is a plan view showing a two-dimensional constitution of a micro fluid distribution device M in accordance with an embodiment of the present invention. In addition, FIG. 2 is a view showing the constitution of a micro plant P using the micro fluid distribution device M. The micro fluid distribution device M is provided to uniformly distribute a processing fluid W (not shown), which is to be processed in a micro plant P having a numbering-up structure, into five fluids, and as shown in FIG. 1, includes an input micro flow channel Rc 11 (input flow channel), branch micro flow channels Rc21 to Rc44 and Rs11 to Rs48 (branch flow channels), and output micro flow channels Rc51 to Rc55 (output flow channels).

In addition, in the micro flow channels, a subscript "c" represents a micro flow channel extending in the x-axis direction of the x-y coordinates, and a subscript "s" represents a micro flow channel extending in the y-axis direction of the x-y coordinates. In the branch micro flow channels Rc21 to Rc44 and Rs11 to Rs48, flow channel lengths Lc of the micro flow channels Rc21 to Rc44 extending in the x-axis direction are the same, and flow channel lengths Ls of the micro flow channels Rs11 to Rs48 extending in the y-axis direction are also the same.

Individually, the input micro flow channel Rc11 disposed at a left end, has a predetermined length Lc11, a predetermined cross-sectional area Ac11, and a hydraulic equivalent diameter Dc11 and extends in the x-axis direction to output the processing fluid W input from one end (the left end) to the pair of branch micro flow channels Rs11 and Rs12 at the other end (a right end). The processing fluid W is supplied from the exterior to the left end of the input micro flow channel Rc11 at a predetermined flow rate q11.

In the pair of branch micro flow channels Rs11 and Rs12, one branch micro flow channel Rs11 has a predetermined length Ls11 (not shown), a predetermined cross-sectional area As11 (not shown), a hydraulic equivalent diameter Ds11 (not shown) and extends in the y-axis direction to output the processing fluid W input from one end (a lower end) to the branch micro flow channel Rc21 at the other end (an upper end), and the other branch micro flow channel Rs12 has a predetermined length Ls12 (not shown), a predetermined cross-sectional area As12 (not shown), and a hydraulic equivalent diameter Ds12 (not shown) and extends in the y-axis direction to output the processing fluid W input from one end (an upper end) to the branch micro flow channel Rc22 at the other end (a lower end).

The branch micro flow channel Rc21 has a predetermined length Lc21, a predetermined cross-sectional area Ac21, and a hydraulic equivalent diameter Dc21 and extends in the x-axis direction to output the processing fluid W input from one end (a left end) to the pair of branch micro flow channels Rs21 and Rs22 at the other end (a right end). In addition, the branch micro flow channel Rc22 has a predetermined length Lc22, a predetermined cross-sectional area Ac22, and a hydraulic equivalent diameter Dc22 and extends in the x-axis direction to output the processing fluid W input from one end (a left end) to the pair of branch micro flow channels Rs23 and Rs24 at the other end (a right end).

In the pair of branch micro flow channels Rs21 and Rs22, one branch micro flow channel Rs21 has a predetermined length Ls21 (not shown), a predetermined cross-sectional area As21 (not shown), and a hydraulic equivalent diameter Ds21 (not shown) and extends in the y-axis direction to output the processing fluid W input from one end (a lower end) to the branch micro flow channel Rc31 at the other end (an upper end), and the other branch micro flow channel Rs22 has a predetermined length Ls22 (not shown), a predetermined cross-sectional area As22 (not shown), and a hydraulic equivalent diameter Ds22 (not shown) and extends in the y-axis direction to output the processing fluid W input from one end (an upper end) to the branch micro flow channel Rc32 at the other end (a lower end).

In addition, in the pair of branch micro flow channels Rs23 and Rs24, one branch micro flow channel Rs23 has a predetermined length Ls23 (not shown), a predetermined cross-sectional area As23 (not shown), and a hydraulic equivalent diameter Ds23 (not shown) and extends in the y-axis direction to output the processing fluid W input from one end (a lower end) to the branch micro flow channel Rc32 at the other end (an upper end), and the other branch micro flow channel Rs24 has a predetermined length Ls24 (not shown), a predetermined cross-sectional area As24 (not shown), and a hydraulic equivalent diameter Ds24 (not shown) and extends in the y-axis direction to output the processing fluid W input from one end (an upper end) to the branch micro flow channel Rc33 at the other end (a lower end).

The branch micro flow channel Rc31 has a predetermined length Lc31, a predetermined cross-sectional area Ac31, and a hydraulic equivalent diameter Dc31 and extends in the x-axis direction to output the processing fluid W input from one end (a left end) to the pair of branch micro flow channels Rs31 and Rs32 at the other end (a right end). The branch micro flow channel Rc32 has a predetermined length Lc32, a predetermined cross-sectional area Ac32, and a hydraulic equivalent diameter Dc32 and extends in the x-axis direction to output the processing fluid W input from one end (a left end) to the pair of branch micro flow channels Rs33 and Rs34 at the other end (a right end). The branch micro flow channel Rc33 has a predetermined length Lc33, a predetermined cross-sectional area Ac33, and a hydraulic equivalent diameter Dc33 and extends in the x-axis direction to output the processing fluid W input from one end (a left end) to the pair of branch micro flow channels Rs35 and Rs36 at the other end (a right end).

In the pair of branch micro flow channels Rs31 and Rs32, one branch micro flow channel Rs31 has a predetermined length Ls31 (not shown), a predetermined cross-sectional area As31 (not shown), and a hydraulic equivalent diameter Ds31 (not shown) and extends in the y-axis direction to output the processing fluid W input from one end (a lower end) to the branch micro flow channel Rc41 at the other end (an upper end), and the other branch micro flow channel Rs32 has a predetermined length Ls32 (not shown), a predetermined cross-sectional area As32 (not shown), and a hydraulic equivalent diameter Ds32 (not shown) and extends in the y-axis direction to output the processing fluid W input from one end (an upper end) to the branch micro flow channel Rc42 at the other end (a lower end).

In addition, in the pair of branch micro flow channels Rs33 and Rs34, one branch micro flow channel Rs33 has a predetermined length Ls33 (not shown), a predetermined cross-sectional area As33 (not shown), and a hydraulic equivalent diameter Ds33 (not shown) and extends in the y-axis direction to output the processing fluid W input from one end (a lower end) to the branch micro flow channel Rc42 at the other end (an upper end), and the other branch micro flow channel Rs34 has a predetermined length Ls34 (not shown), a predetermined cross-sectional area As34 (not shown), and a hydraulic equivalent diameter Ds34 (not shown) and extends in the y-axis direction to output the processing fluid W input from one end (an upper end) to the branch micro flow channel Rc43 at the other end (a lower end).

Further, in the pair of branch micro flow channels Rs35 and Rs36, one branch micro flow channel Rs35 has a predetermined length Ls35 (not shown), a predetermined cross-sectional area As35 (not shown), and a hydraulic equivalent diameter Ds35 (not shown) and extends in the y-axis direction to output the processing fluid W input from one end (a lower end) to the branch micro flow channel Rc43 at the other end (an upper end), and the other branch micro flow channel Rs36 has a predetermined length Ls36 (not shown), a predetermined cross-sectional area As36 (not shown), and a hydraulic equivalent diameter Ds36 (not shown) and extends in the y-axis direction to output the processing fluid W input from one end (an upper end) to the branch micro flow channel Rc44 at the other end (a lower end).

The branch micro flow channel Rc41 has a predetermined length Lc41, a predetermined cross-sectional area Ac41, and a hydraulic equivalent diameter Dc41 and extends in the x-axis direction to output the processing fluid W input from one end (a left end) to the pair of branch micro flow channels Rs41 and Rs42 at the other end (a right end). The branch micro flow channel Rc42 has a predetermined length Lc42, a predetermined cross-sectional area Ac42, and a hydraulic equivalent diameter Dc42 and extends in the x-axis direction to output the processing fluid W input from one end (a left end) to the pair of branch micro flow channels Rs43 and Rs44 at the other end (a right end).

The branch micro flow channel Rc43 has a predetermined length Lc43, a predetermined cross-sectional area Ac43, and a hydraulic equivalent diameter Dc43 and extends in the x-axis direction to output the processing fluid W input from one end (a left end) to the pair of branch micro flow channel Rs45 and Rs46 at the other end (a right end). The branch micro flow channel Rc44 has a predetermined length Lc44, a predetermined cross-sectional area Ac44, and a hydraulic equivalent diameter Dc44 and extends in the x-axis direction to output the processing fluid W input from one end (a left end) to the pair of branch micro flow channels Rs47 and Rs48 at the other end (a right end).

In the pair of branch micro flow channels Rs41 and Rs42, one branch micro flow channel Rs41 has a predetermined length Ls41 (not shown), a predetermined cross-sectional area As41 (not shown), and a hydraulic equivalent diameter Ds41 (not shown) and extends in the y-axis direction to output the processing fluid W input from one end (a lower end) to the output micro flow channel Rc51 at the other end (an upper end), and the other branch micro flow channel Rs42 has a predetermined length Ls42 (not shown), a predetermined cross-sectional area As42 (not shown), and a hydraulic equivalent diameter Ds42 (not shown) and extends in the y-axis direction to output the processing fluid W input from one end (an upper end) to the output micro flow channel Rc52 at the other end (a lower end).

In addition, in the pair of branch micro flow channels Rs43 and Rs44, one branch micro flow channel Rs43 has a predetermined length Ls43 (not shown), a predetermined cross-sectional area As43 (not shown), and a hydraulic equivalent diameter Ds43 (not shown) and extends in the y-axis direction to output the processing fluid W input from one end (a lower end) to the output micro flow channel Rc52 at the other end (an upper end), and the other branch micro flow channel Rs44 has a predetermined length Ls44 (not shown), a predetermined cross-sectional area As44 (not shown), and a hydraulic equivalent diameter Ds44 (not shown) and extends in the y-axis direction to output the processing fluid W input from one end (an upper end) to the output micro flow channel Rc53 at the other end (a lower end).

Further, in the pair of branch micro flow channels Rs45 and Rs46, one branch micro flow channel Rs45 has a predetermined length Ls45 (not shown), a predetermined cross-sectional area As45 (not shown), and a hydraulic equivalent diameter Ds45 (not shown) and extends in the y-axis direction to output the processing fluid W input from one end (a lower end) to the output micro flow channel Rc53 at the other end (an upper end), and the other branch micro flow channel Rs46 has a predetermined length Ls46 (not shown), a predetermined cross-sectional area As46 (not shown), and a hydraulic equivalent diameter Ds46 (not shown) and extends in the y-axis direction to output the processing fluid W input from one end (an upper end) to the output micro flow channel Rc54 at the other end (a lower end).

Furthermore, in the pair of branch micro flow channels Rs47 and Rs48, one branch micro flow channel Rs47 has a predetermined length Ls47 (not shown), a predetermined cross-sectional area As47 (not shown), and a hydraulic equivalent diameter Ds47 (not shown) and extends in the y-axis direction to output the processing fluid W input from one end (a lower end) to the output micro flow channel Rc54 at the other end (an upper end), and the other branch micro flow channel Rs48 has a predetermined length Ls48 (not shown), a predetermined cross-sectional area As48 (not shown), and a hydraulic equivalent diameter Ds48 (not shown) and extends in the y-axis direction to output the processing fluid W input from one end (an upper end) to the output micro flow channel Rc55 at the other end (a lower end).

The output micro flow channel Rc51 has a predetermined length Lc51, a predetermined cross-sectional area Ac51, and a hydraulic equivalent diameter Dc51 and extends in the x-axis direction to output the processing fluid W input from one end (a left end) to the other end (a right end). The output micro flow channel Rc52 has a predetermined length Lc52, a predetermined cross-sectional area Ac52, and a hydraulic equivalent diameter Dc52 and extends in the x-axis direction to output the processing fluid W input from one end (a left end) to the other end (a right end). The output micro flow channel Rc53 has a predetermined length Lc53, a predetermined cross-sectional area Ac53, and a hydraulic equivalent diameter Dc53 and extends in the x-axis direction to output the processing fluid W input from one end (a left end) to the other end (a right end).

The output micro flow channel Rc54 has a predetermined length Lc54, a predetermined cross-sectional area Ac54, and a hydraulic equivalent diameter Dc54 and extends in the x-axis direction to output the processing fluid W input from one end (a left end) to the other end (a right end). The output micro flow channel Rc55 has a predetermined length Lc55, a predetermined cross-sectional area Ac55, and a hydraulic equivalent diameter Dc55 and extends in the x-axis direction to output the processing fluid W input from one end (a left end) to the other end (a right end).

The micro fluid distribution device M having such a flow channel shape (structure) includes ten fluid bifurcation portions B11 to B44 for distributing the processing fluid W, six fluid junction portions G21 to G43 for joining the processing fluid W and eight connection portions J11 to J42, so that the processing fluid W supplied to one input micro flow channel Rc11 is distributed into and joined with the fluid bifurcation portions B11 to B44 and the fluid junction portions G21 to G43 to finally output the fluid to the exterior through five output micro flow channels Rc51 to Rc55. That is, the micro fluid distribution device M combines the total 29 branch micro flow channels Rc21 to Rc44 and Rs11 to Rs48 to form ten fluid bifurcation portions B11 to B44, six fluid junction portions G21 to G43 and eight connection portions J11 to J42 of the processing fluid W.

In addition, in the micro fluid distribution device M, all micro flow channels, that is, the input micro flow channel Rc11, the branch micro flow channels Rc21 to Rc44 and Rs11 to Rs48, and the output micro flow channels Rc51 to Rc55 have the same cross-sectional areas Ac11 to Ac55 and As11 to As48, and the same hydraulic equivalent diameters Dc11 to Dc55 and Ds11 to Ds48. While this will be described in detail hereinafter, the micro fluid distribution device M is designed based on a pressure drop compartment connection model such that the processing fluid W input from the exterior to the input micro flow channel Rc11 is uniformly distributed to the output micro flow channels Rc51 to Rc55, i.e., flow rates q51 to q55 of the processing fluid W output to the exterior are the same.

The micro plant P includes the micro fluid distribution device M, a micro supply tank 1, a micro pump 2, micro processing devices RA1 to RA5, a micro fluid collection device 4, a micro collection tank 5, two micro flow meters FM1 and FM5, and a monitoring device 6.

The micro supply tank 1 stores the processing fluid W as a process material, and the micro pump 2 discharges the processing fluid W from the micro supply tank 1 to supply the processing fluid W to the input micro flow channel Rc11 of the micro fluid distribution device M. The micro fluid distribution device M uniformly distributes the processing fluid W into five fluids, and supplies the five processing fluids W from the output micro flow channels (parallel flow channels) Rc51 to Rc55 to the micro processing devices RA1 to RA5.

The micro processing devices RA1 to RA5 perform a predetermined process on the processing fluid W supplied through the output micro flow channels (parallel flow channels) Rc51 to Rc55 to output the processed fluid Xa to input micro flow channels (parallel flow channels) Rc61 to Rc65 of the micro fluid collection device 4. As shown, the micro fluid collection device 4 has a flow channel shape, in which the micro fluid distribution device M is mirror-reversed, so that the processed fluids Wa input from the micro processing devices RA1 to RA5 are collected to be output to the micro collection tank 5 through one output micro flow channel Rc101.

The micro collection tank 5 collects and stores the processed fluid Wa supplied from the micro fluid collection device 4. In the two micro flow meters FM1 and FM5, one micro flow meter FM1 is installed at the output micro flow channel Rc51 to measure the flow rate q51 of the processing fluid W flowing through the output micro flow channel Rc51 corresponding thereto and output the measured value to the monitoring device 6. In addition, the other micro flow meter FM5 is installed at the output micro flow channel Rc55 to measure the flow rate q55 of the processing fluid W flowing through the output micro flow channel Rc55 corresponding thereto and output the measured value to the monitoring device 6.

In addition, in the micro plant P, while the micro flow meter FM1 is installed at the output micro flow channel Rc51 and the micro flow meter FM5 is installed at the output micro flow channel Rc55, the micro flow meters may be installed arbitrarily at two of the five output micro flow channels Rc51 to Rc55. The reason for this will be described hereinafter.

The monitoring device 6 is a kind of computer for monitoring the blockage of the micro fluid distribution device M based on a predetermined monitoring program. The monitoring device 6 monitors the blockage of the output micro flow channels (parallel flow channels) Rc51 to Rc55 by calculating the flow rates q51 and q55 of the two micro flow meters FM1 and FM5 installed at the each of output micro flow channels Rc51 and Rc55, based on the monitoring program. In addition, the monitoring process of the monitoring device 6 will be described in detail below as a method of detecting the blockage of the output micro flow channels (parallel flow channels) Rc51 to Rc55.

Next, a method of designing the micro fluid distribution device M will be described in detail with reference to FIGS. 3 and 4.

The design of the micro fluid distribution device M is to optimize flow channel lengths of the output micro flow channels Rc51 to Rc55 such that flow rates of the processing fluid W flowing through the output micro flow channels Rc51 to Rc55 are equal to each other. Here, provided that there is no compression or expansion of the processing fluid W, the flow rate of the processing fluid W may be considered equal to an average fluid velocity (a linear velocity) of the processing fluid W.

Therefore, this design requires optimal flow channel lengths of the output micro flow channels (parallel flow channels) Rc51 to Rc55 satisfying a condition in which the averaged flow velocities of the processing fluid W of the output micro flow channels Rc51 to Rc55 are equal to each other. In addition, a pressure drop compartment (PDC) connection model is employed as a design technique requiring optimal flow channel lengths of the output micro flow channels (parallel flow channels) Rc51 to Rc55 satisfying the above condition. This PDC connection model is disclosed in detail in a paper issued in 2005, [Osamu Tonomura, Manabu Kano, Shinji Hasebe and Masaru Noda: "Optimal shape design and operation of microreactors" Proceedings of the 7th World Congress of Chemical Engineering (WCCE), CD-ROM, O35-003, Glasgow, Scotland, Jul. 10-14(2005)]

Figure 3:
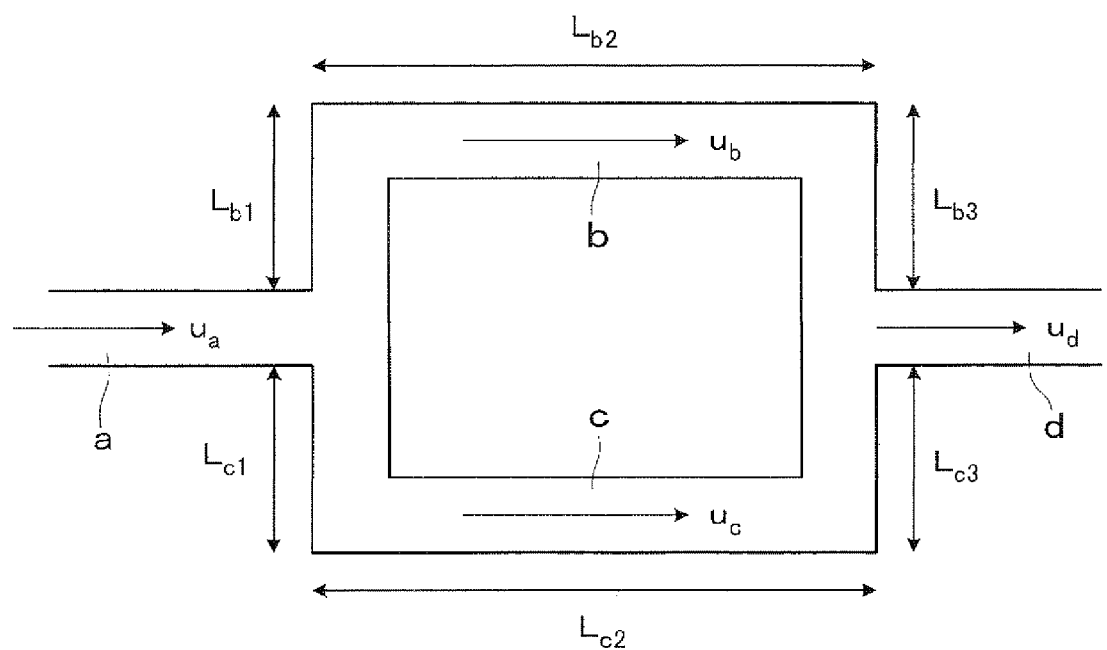
FIG. 3 shows a flow channel model optimally simplified for description of a pressure drop compartment (PDC) connection model of the embodiment of the present invention.

FIG. 3 shows an example of flow channel models for explaining the PDC connection model. In the flow channel model, a single flow channel a is bifurcated into two flow channels (fluid-diverged flow channels) b and c and then joined into a single flow channel d, and the flow channels a to d have the same cross-sectional area A.

In the flow channel model, provided that averaged flow velocities of the fluid of the flow channels a to d are represented as $u_a$, $u_b$, $u_c$ and $u_d$, and the two distributed flow channels b and c have lengths of the straight portions of $L_{b1}$ to $L_{b3}$ and $L_{c1}$ to $L_{c3}$, a hydraulic equivalent diameter of $D_H$, a fluid viscosity coefficient of $\mu$, and a parameter $\lambda$ essentially determined by the hydraulic equivalent diameter $D_H$, a fluid balance of a bifurcated portion (a diverging portion of the fluid) between the flow channel a and the two distributed flow channels b and c is represented by equation (1), a fluid balance of a joint portion (a converging portion of the fluid) between the two distributed flow channels b and c and the flow channel d is represented by equation (2), and a pressure balance between the two distributed flow channels b and c is represented by equation (3).

[Mathematical Formula 1]

<<Fluid Balance Equations of Fluid Diverging Portion and Converging Portion>>

$$u_a A = u_b A + u_c A \quad (1)$$

$$u_b A + u_c A = u_d A \quad (2)$$

[Mathematical Formula 2]

<<Pressure Balance Equation>> (3)

$$\frac{32\lambda\mu L_{b1}}{D_H^2}u_b + \frac{32\lambda\mu L_{b2}}{D_H^2}u_b + \frac{32\lambda\mu L_{b3}}{D_H^2}u_b = \frac{32\lambda\mu L_{c1}}{D_H^2}u_c + \frac{32\lambda\mu L_{c2}}{D_H^2}u_c + \frac{32\lambda\mu L_{c3}}{D_H^2}u_c$$

Here, since it can be provided that properties of the fluid of the flow channels a to d are constant, the fluid balance equations (1) and (2) and the pressure balance equation (3) can be simplified as the following fluid balance equations (4) and (5) and the pressure balance equation (6).

In the PDC connection model, the shapes or averaged flow velocities of the flow channels a to d are obtained by solving simultaneous equations (4) to (6). For example, three parameters, i.e., the averaged flow velocities $u_b$, $u_c$ and $u_d$ of the flow channels b to d can be obtained by providing the lengths $L_{b1}$ to $L_{b3}$ and $b_{c1}$ to $L_{c3}$ of the flow channels a to d and the linear velocity $u_a$ (an inlet linear velocity) of the flow channel a corresponding to an inlet of the fluid as integers.

[Mathematical Formula 3]

<<Fluid Balance Equations of Fluid Diverging Portion and Converging Portion>>

$$u_a = u_b + u_c \quad (4)$$

$$u_b + u_c = u_d \quad (5)$$

[Mathematical Formula 4]

<<Pressure Balance Equation>>

$$(L_{b1}+L_{b2}+L_{b3})u_b = (L_{c1}+L_{c2}+L_{c3})u_c \quad (6)$$

FIG. 4 is a flow channel model (a design model) for applying the PDC connection model to the design of the micro fluid distribution device M. This design model has the same flow channel shape as the micro plant P shown in FIG. 2, i.e., a flow channel shape in which the micro fluid distribution device M is connected to the micro fluid collection device 4.

In this design model, when positions in the x-axis direction of the branch micro flow channels Rc21 to Rc44 and Rs11 to Rs48 are represented as i, i is an integer between 1 and 9, and when positions in the y-axis are represented as j, j is an integer between 1 and 5. The maximum value of j, which is 5, corresponds to the number of the output micro flow channels Rc51 to Rc55 of the micro fluid distribution device M.

When averaged flow velocities of the branch micro flow channels Rc21 to Rc44 and Rs11 to Rs48 are represented as $u^c_{ij}$ and $u^s_{ij}$ using i and j, a fluid balance of the fluid bifurcation portions B11 to B44 and B51 to B71 of the flow channel model is represented as the following equations (7) and (8), a fluid balance of the fluid junction portions G21 to G43 and G51 to G81 is represented as the following equations (9) and (10), a fluid balance of the connection portions J11 to J44 and J51 to J82 is represented as the following equations (11) to (14), and a pressure balance between the flow channels is represented as the following equations (15) to (17). In addition, in these equations (7) to (17), the maximum value of j corresponding to the number of the output micro flow channels Rc51 to Rc55 is generalized as [N].

[Mathematical Formula 5]

<<Fluid Balance Equations of Fluid Diverging Portion>>

$$u_{i,j}^C = u_{i,2j-1}^S + u_{i,2j}^S$$

$$i=1,2,\ldots,N-1\ j=1,2,\ldots,i \quad (7)$$

$$u_{i,j}^C = u_{i,2j}^S + u_{i,2j+1}^S$$

$$i=N,N+1,\ldots 2N-3\ j=1,2,\ldots,2N-2-i \quad (8)$$

[Mathematical Formula 6]

<<Fluid Balance Equations of Fluid Converging Portion>>

$$u_{i+1,j+1}^C = u_{i,2j}^S + u_{i,2j+1}^S$$

$$i=2,3,\ldots,N-1\ j=1,2,\ldots,i-1 \quad (9)$$

$$u_{i+1,j}^C = u_{i,2j-1}^S + u_{i,2j}^S$$

$$i=N,N+1,\ldots,2N-2\ j=1,2,\ldots,2N-1-i \quad (10)$$

[Mathematical Formula 7]
<<Fluid Balance Equations of Connection Portion>>

$$u_{i+1,1}{}^C = u_{i,1}{}^S$$

$$i = 1, 2, \ldots, N-1 \quad (11)$$

$$u_{i+1,j+1}{}^C = u_{i,2i}{}^S$$

$$i = 1, 2, \ldots, N-1 \quad (12)$$

$$u_{i,1}{}^C = i_{i,1}{}^S$$

$$i = N, N+1, \ldots, 2N-2 \quad (13)$$

$$u_{i,2N-i}{}^C = u_{i,4N-2-2i}{}^S$$

$$i = N, N+1, \ldots, 2N-2 \quad (14)$$

[Mathematical Formula 8]
<<Pressure Balance Equations>>

$$L_S(u_{i,2j-1}{}^S + u_{i+1,2j}{}^S) + L_C u_{i+1,j}{}^C = L_S(u_{i,2j}{}^S + u_{i+1,2j+1}{}^S) + L_C u_{i+1,j+1}{}^C$$

$$i = 1, 2, \ldots, N-2 \; j = 1, 2, \ldots, i \quad (15)$$

$$L_S(u_{N-1,2j-1}{}^S + u_{N,2j-1}{}^S) + L_j u_{N,j}{}^C = L_S(u_{N-1,2j}{}^S + u_{N,2j}{}^S) + L_{j+1} u_{N,j+1}{}^C$$

$$j = 1, 2, \ldots, N-1 \quad (16)$$

$$L_S(u_{i,2j}{}^S + u_{i+1,2j-1}{}^S) + L_C u_{i+1,j}{}^C = L_S(u_{i,2j+1}{}^S + u_{i+1,2j}{}^S) + L_C u_{i+1,j+1}{}^C$$

$$i = N, N+1, \ldots, 2N-3 \; j = 1, 2, \ldots, 2N-2-i \quad (17)$$

When simultaneous equations of these eleven equations (7) to (17) are solved, since the total number of the fluid bifurcation portions B11 to B44 and B51 to B71 is 16, the total number of the fluid junction portions G21 to G43 and G51 to G81 is also 16, and the total number of the connection portions J11 to J44 and J51 to J82 is also 16, the numbers of parameters and equations are shown as the following Table 1.

As shown in Table 1, the difference between the numbers of parameters and equations is 8, and other parameters can be readily found by designating 8 parameters. Since numerical analysis software on the market can be used as a means for solving these simultaneous equations, there is no need for a massive calculation process based on a computational fluid dynamics (CFD). Therefore, the design method of the micro fluid distribution device M using the PDC connection model is more convenient than the design method using the conventional CFD. In addition, the entire design of the design model may be completed by setting an appropriate boundary condition, for example, setting a fluid balance equation and a pressure balance equation at only a left half of the design model, because of the mirror symmetry of the design model.

TABLE 1

| Items | Parameter name, Equation classification | Parameter name, Equation number | Number | Sum |
|---|---|---|---|---|
| Number of parameters | X direction linear velocity | $u^c$ | 25 | 72 |
|  | Y direction linear velocity | $u^s$ | 40 |  |
|  | Y direction flow channel length | $L_c$ | 1 |  |
|  | X direction flow channel length | $L_s$ | 1 |  |
|  | Flow channel length of parallel flow channel | $L_j$ | 5 |  |
| Number of equations | Fluid diverging portion | Equations (7), (8) | 16 | 64 |
|  | Fluid converging portion | Equations (9), (10) | 16 |  |
|  | Connection portion | Equations (11), (12), (13), (14) | 16 |  |
|  | Pressure balance | Equations (15), (16), (17) | 16 |  |
| Number of parameters − number of equations |  |  |  | 8 |

In the simultaneous equations including these equations (7) to (17), it is necessary to provide the optimal flow channel lengths of the output micro flow channels (parallel flow channels) Rc51 to Rc55 satisfying the above-mentioned condition that the averaged flow velocities $u^c56$ to $u^c55$ of the processing fluid W of the output micro flow channels (parallel flow channels) Rc51 to Rc55 are equal to each other.

In addition to the above-mentioned condition, in consideration of vertical symmetry of a process of the branch micro flow channels Rc11 to Rc44 and Rs11 to Rs48 having a flow channel length of Lc=0.05 m in the y-axis direction, a flow channel length of Ls=0.10 m in the x-axis direction, and an input average flow velocity of $u^c11$=5 m/s, the flow channel length L1 of the output micro flow channel Rc51 and the flow channel length L5 of the output micro flow channel Rc55, which are symmetrical with respect to the x-axis, are equal to each other, the flow channel length L2 of the output micro flow channel Rc52 and the flow channel length L4 of the output micro flow channel Rc54 are equal to each other, and in order to prevent a predominant pressure drop of the output micro flow channels (parallel flow channels) Rc51 to Rc55, the flow channel length L1 of the output micro flow channel Rc51 and the flow channel length L5 of the output micro flow channel Rc55 are determined as 0.5 m.

The number of parameters is reduced by 6 due to the additional conditions, and the flow channel length L2 of the output micro flow channel Rc52 and the flow channel length L3 of the output micro flow channel Rc53 become design parameters. Table 2 shows results in which the design parameters are required based on the simultaneous equations including the equations (7) to (17). Since the optimal flow channel lengths of the output micro flow channels (parallel flow channels) Rc51 to Rc55 shown in Table 2 satisfy the above-mentioned conditions, it is possible to equalize all of the averaged flow velocities $u^c51$ to $u^c55$ of the processing fluid W of the output micro flow channels (parallel flow channels) Rc51 to Rc55, i.e., the flow rates q51 to q55 of the processing fluid W of the output micro flow channels (parallel flow channels) Rc51 to Rc55.

TABLE 2

| Parallel flow channel number | Rc51 | Rc52 | Rc53 | Rc54 | Rc55 |
|---|---|---|---|---|---|
| Optimal flow channel length (m) | 0.5000 | 0.5797 | 0.6095 | 0.5797 | 0.5000 |

Here, in the simultaneous equations including the equations (7) to (17), provided that the output micro flow channels (parallel flow channels) Rc51 to Rc55 have the same flow channel length $L_j$(j=1 to 5)=0.5 m, the branch micro flow channels Rc11 to Rc44 and Rs11 to Rs48 have a flow channel length of $L_c$=0.05 m in the y-axis direction and a flow channel length of Ls=0.10 m in the x-axis direction, and an input average fluid speed of $u^c51$=5 m/sec, when the averaged flow velocities $u^c_{N,j}$ (N=5 and j=1 to 5) of the processing fluid W of the output micro flow channels (parallel flow channels) Rc51 to Rc55 are needed, the averaged flow velocities $u^c_{N,J}$ (N=5 and J=1 to 5) may be obtained as the following Table 3. As shown in Table 3, when the output micro flow channels (parallel flow channels) Rc51 to Rc55 have the same flow channel length, the averaged flow velocities $u^c_{N,j}$ (N=5 and j=1 to 5) of the processing fluid W of the output micro flow channels (parallel flow channels) Rc51 to Rc55 are not equal to each other, and thus, the processing fluid W cannot be uniformly distributed to the output micro flow channels (parallel flow channels) Rc51 to Rc55.

TABLE 3

| Parallel flow channel number | Rc51 | Rc52 | Rc53 | Rc54 | Rc55 |
|---|---|---|---|---|---|
| Linear velocity (m/s) | 0.914 | 1.042 | 1.088 | 1.042 | 0.914 |

In addition, when the flow channel lengths Lc and Ls of the flow channels other than the output micro flow channels Rc51 to Rc55, i.e., the branch micro flow channels Rc21 to Rc44 and Rs11 to Rs48, are used as design parameters, a non-linear term is generated by the product of the flow channel lengths and the averaged flow velocities of the pressure balance equation. However, when the flow channel lengths $L_3$ (j=1 to 5) of the output micro flow channels (parallel flow channels) Rc51 to Rc55 are used as design parameters, since the averaged flow velocities $u^c_{N,j}$ (N=5 and j=1 to 5) of the output micro flow channels (parallel flow channels) Rc51 to Rc55 can be processed as an integer represented as the ratio between the linear velocity $u^c11$ (an inlet fluid velocity) of the input micro flow channel Rc11 and the number of parallel flow channels, a solution can be readily searched by solving the linear equations.

In addition, when all of the flow channel lengths of the branch micro flow channels Rc21 to Rc44 and Rs11 to Rs48 of the micro fluid distribution device M have a fixed value, since the linear velocity uc11 (an inlet fluid velocity) of the input micro flow channel Rc11 and the averaged flow velocities $u^c_{N,j}$ (N=5 and j=1 to 5) of the output micro flow channels (parallel flow channels) Rc51 to Rc55 are in a linear relationship, uniform distribution of the processing fluid W can be maintained even when the linear velocity $u^c11$ (an inlet fluid velocity) of the input micro flow channel Rc11 varies.

Further, in this design method, while the fluid balance equations (1) and (2) have a uniform flow channel cross-sectional area A at all places of the flow channels and the pressure balance equation (3) has a premise that a hydraulic equivalent diameter DH is uniform at all places of the flow channels, the simultaneous equations may be solved by adjusting the flow channel cross-sectional areas $A_{N,j}$ (j=1 to N) of the output micro flow channels (parallel flow channels) Rc51 to Rc55 under the condition that an average flow rates $F_{N,j}$ (j=1 to N) of the output micro flow channels (parallel flow channels) Rc51 to Rc55 obtained by the product of the cross-sectional area $A_{N,j}$ (j=1 to N) and the linear velocity $u^c_{N,j}$ (N=5 and j=1 to 5) of the corresponding flow channel are constant.

Next, several modified examples of the micro fluid distribution device M will be described with reference to FIGS. 5A, 5B, 6A and 6B. The fluid distribution device in accordance with the present invention includes at least three fluid bifurcation portions for distributing the processed fluid and at least one fluid converging portion for joining the processed fluid, by combining a plurality of branch flow channels, and this flow channel structure including the fluid bifurcation portions and the fluid converging portion is shown, for example, in FIGS. 5A, 5B, 6A and 6B.

Figure 5A:
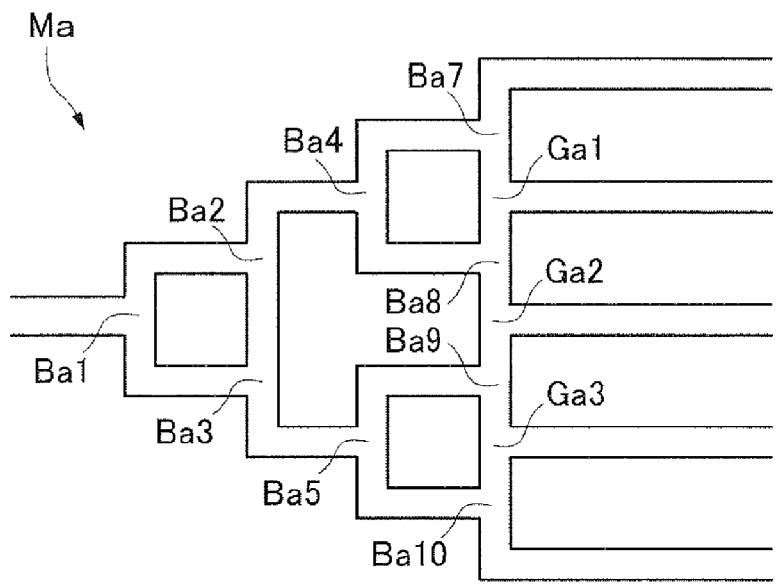
FIG. 5A is a plan view showing a modified example of the micro fluid distribution device M in accordance with the embodiment of the present invention.
Figure 5B:
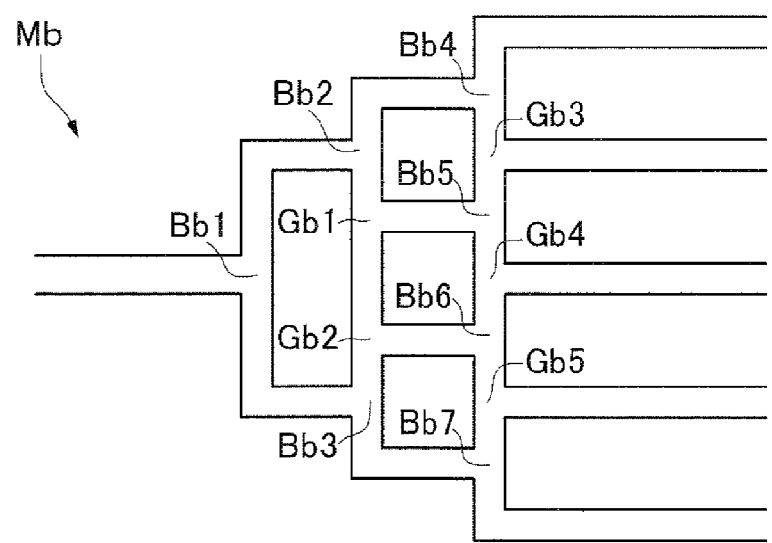
FIG. 5B is a plan view showing a modified example of the micro fluid distribution device M in accordance with the embodiment of the present invention.

A fluid distribution device Ma shown in FIG. 5A includes nine fluid bifurcation portions Ba1 to Ba10 and three fluid junction portions Ga1 to Ga3 so that the fluid is distributed into five output flow channels (parallel flow channels). A fluid distribution device Mb shown in FIG. 5B includes seven fluid bifurcation portions Bb1 to Bb1 and five fluid junction portions Gb1 to Gb5 so that the fluid is distributed into five output flow channels (parallel flow channels), similar to the fluid distribution device Ma.

Figure 6A:
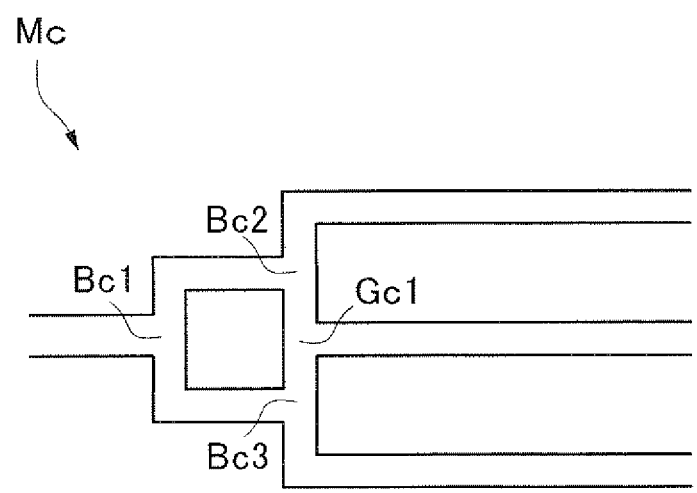
FIG. 6A is a plan view showing a modified example of the micro fluid distribution device M in accordance with the embodiment of the present invention.
Figure 6B:
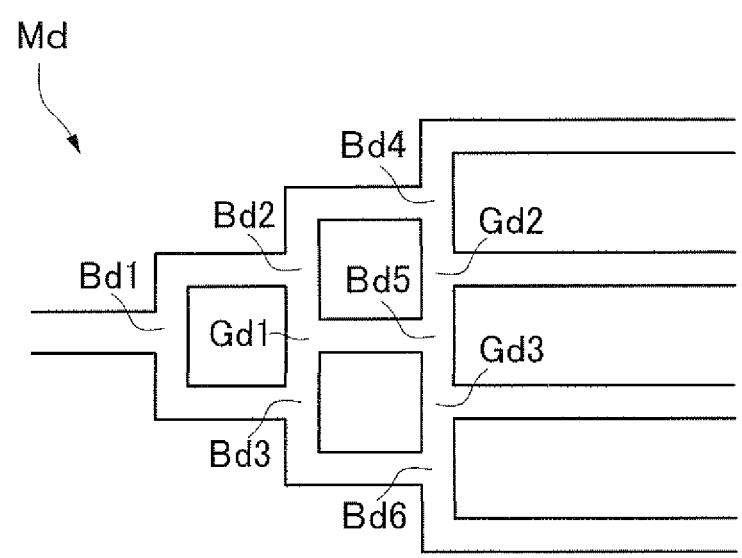
FIG. 6B is a plan view showing a modified example of the micro fluid distribution device M in accordance with the embodiment of the present invention.

A fluid distribution device Mc shown in FIG. 6A, which has the simplest structure, includes three fluid bifurcation portions Bc1 to Bc3 and one fluid converging portion Gc1 so that the fluid is distributed through three output flow channels (parallel flow channels). A fluid distribution device Md shown in FIG. 6B includes six fluid bifurcation portions Bd1 to Bd6 and three fluid junction portions Gd1 to Gd3 so that the fluid is distributed through four output flow channels (parallel flow channels).

In addition, FIGS. 5A, 5B, 6A and 6B show some of the modified examples, and examples including a larger number of fluid bifurcation portions and fluid junction portions and a larger number of output flow channels (parallel flow channels) may be provided. Further, the number of the output flow channels (parallel flow channels) may be an odd number or an even number, and may distribute the fluid into the arbitrary number of output flow channels (parallel flow channels) by appropriately combining fluid bifurcation portions and fluid junction portions.

Next, a method of detecting the blockage of the output micro flow channels (parallel flow channels) Rc51 to Rc55 of the micro fluid distribution device M will be described with reference to FIGS. 7 to 12.

Figure 7:
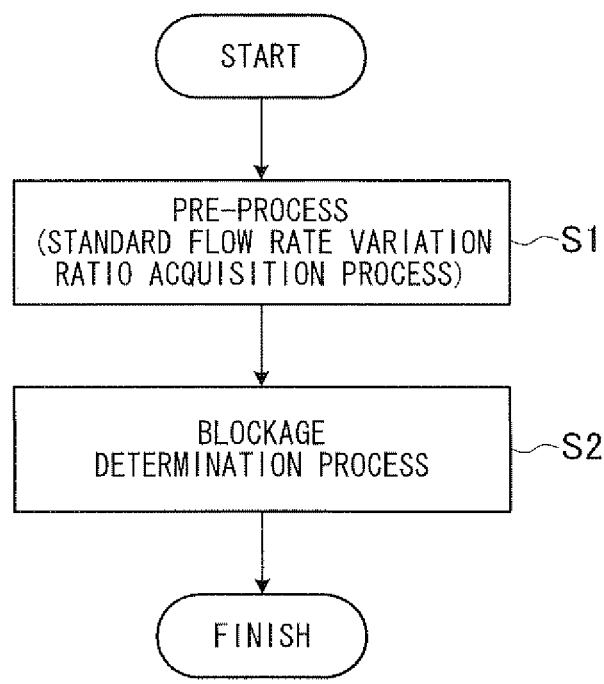
FIG. 7 is a flowchart showing a blockage monitoring process in accordance with the embodiment of the present invention.

FIG. 7 is a flowchart showing a blockage monitoring process performed by the monitoring device 6 based on a monitoring program and flow rates q51 and q55 input from the micro flow meters FM1 and FM5. As shown in this flowchart, the blockage monitoring process includes two steps S1 and S2.

In step S1, a pre-process is performed before a flow channel blockage determination process. In step S1, standard flow rates q01 to q05 and reference flow rates q1 to q5 of the output micro flow channels Rc51 to Rc55 are obtained, and these flow rates are substituted into the equation (18) to calculate a standard flow rate variation ratio $r_{i,j}$(n) and to store the calculated standard flow rate variation ratio in the monitoring device 6. In step S2, the micro plant is operated to perform the flow channel blockage determination process. In step S2, initial flow rates Q01 and Q05 and estimation flow rates Q1 and Q5 of the output micro flow channels Rc51 and Rc55 are obtained, these flow rates are substituted into the equation (18-1) to calculate an operation flow rate variation ratio $R_{1,5}$, and the operation flow rate variation ratio is compared with the standard flow rate variation ratio, thereby performing a process of specifying a flow channel in which blockage occurs. In addition, depending on necessity, a process of calculating a flow rate variation amount $\Delta Q(n)$ and a blockage level $N(n)$ of the specified blockage flow channel is performed.

Here, the standard flow rate is, in step S1, a flow rate of each of the output micro flow channels in a state in which all of the output micro flow channels Rc51 to Rc55 are not blocked, and the reference flow rate is, in step S1, a flow rate of each of the output micro flow channels in a state in which any one of the output micro flow channels Rc51 to Rc55 is forcedly blocked. In addition, the initial flow rate is, in step S2, a flow rate of each of the output micro flow channels just after an operation of the micro plant starts, i.e., in a state in which it is assumed that there is no blockage in the output micro flow channels, and the estimation flow rate is, in step S2, a flow rate of each of the micro flow channels during operation of the micro plant.

Figure 8:
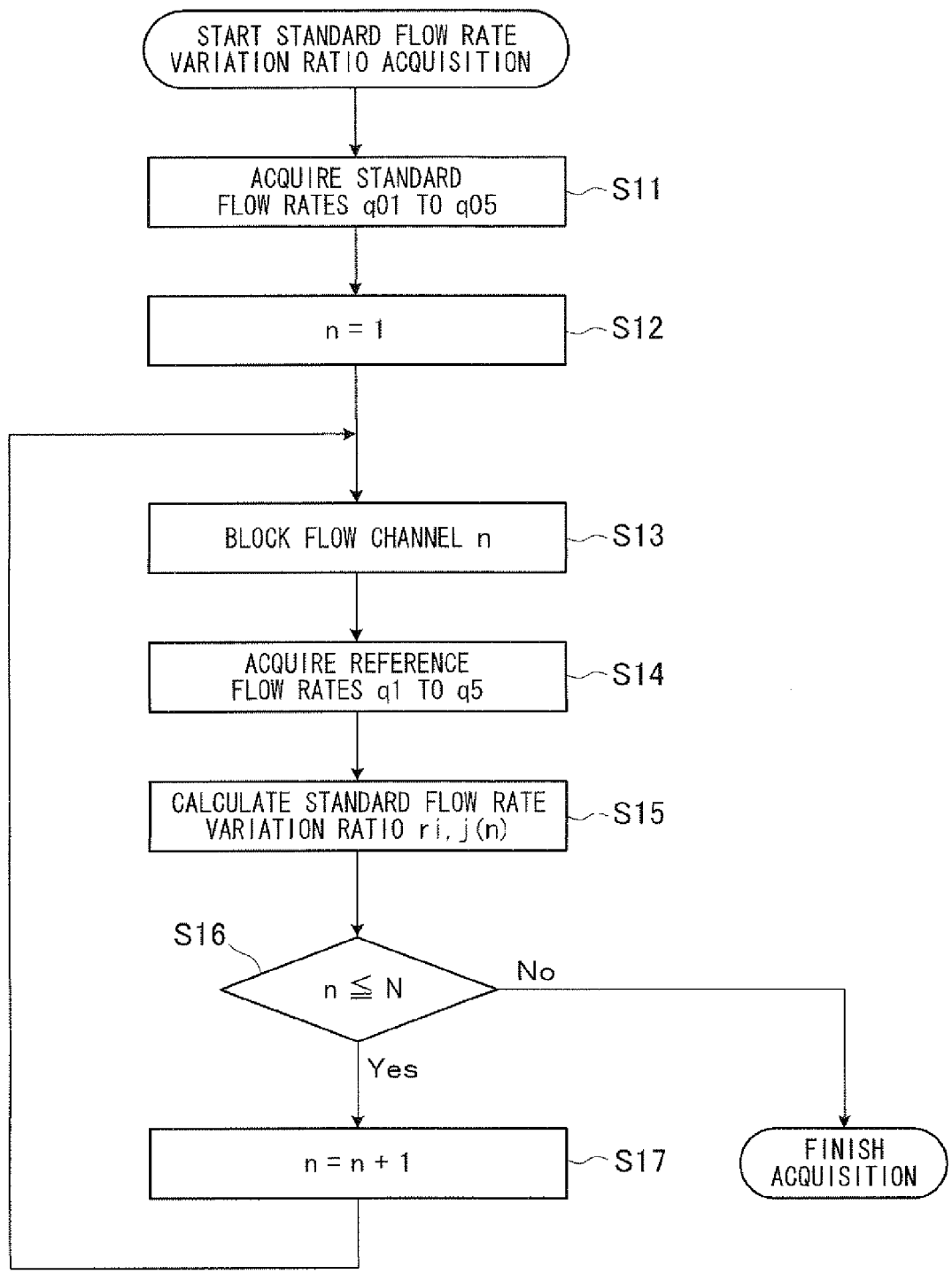
FIG. 8 is a flowchart showing a pre-process (a standard flow rate variation ratio acquisition process) in accordance with the embodiment of the present invention.
Figure 9:
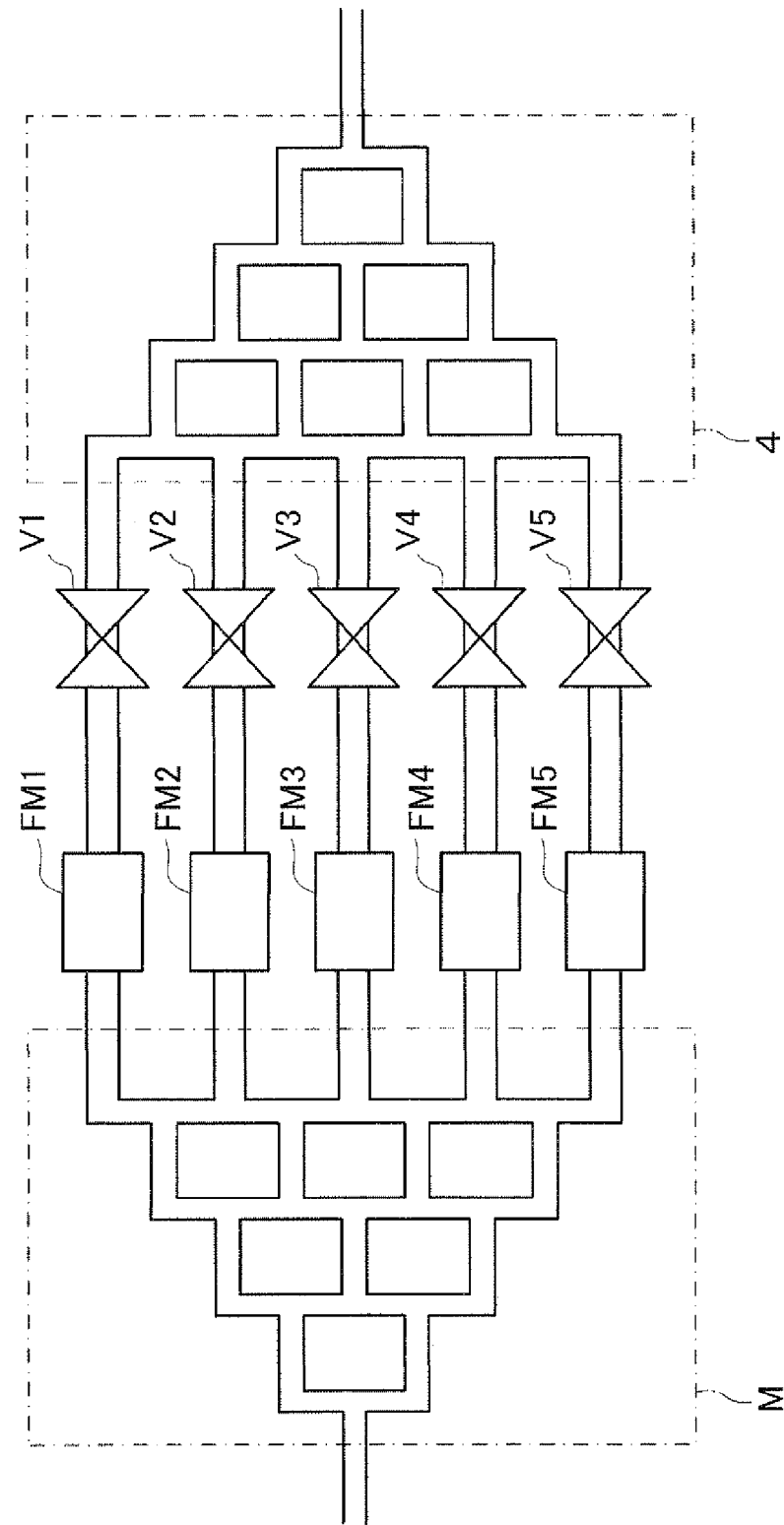
FIG. 9 is a plan view showing the constitution of a flow channel for standard flow rate variation ratio acquisition using the pre-process in accordance with the embodiment of the present invention.

FIG. 8 is a flowchart showing step S1 in detail, and FIG. 9 is a plan view of a flow channel for obtaining a standard flow rate variation ratio used for step S1. In step S1, a flow channel designed in the same manner as the micro plant P (an actual machine) shown in FIG. 2 and to which micro flow meters FM2 to FM4 and flow rate control valves V1 to V5 are added is used.

In step S1, the monitoring device 6 controls the flow rate control valves V1 to V5 to forcedly and sequentially block the output micro flow channels (parallel flow channels) Rc51 to Rc55, thereby obtaining a standard flow rate variation ratio based on measured values (flow rates q1 to q5) of the micro flow meters FM1 to FM5 obtained at this time. In addition, in FIG. 9, the same reference numerals designate the same components as the micro plant shown in FIG. 2.

In step S1, the monitoring device 6 measures flow rates of the output micro flow channels Rc51 to Rc55 in a state in which the output micro flow channels Rc51 to Rc55 are not blocked using the micro flow meters FM1 to FM5, and uses the flow rates as the standard flow rates q01 to q05 (step S11). In addition, the output micro flow channels Rc51 to Rc55 may be numbered with integers of 1 to N (N is the number of the output micro flow channels, in this embodiment, N=5). For example, '1' may correspond to the output micro flow channel Rc51, '2' may correspond to the output micro flow channel Rc52, '3' may correspond to the output micro flow channel Rc53, '4' may correspond to the output micro flow channel Rc54, and '5' may correspond to the output micro flow channel Rc55. This correspondence is previously stored in the monitoring device 6. Further, numbers of the output micro flow channels Rc51 to Rc55 are represented as a parameter n, and an initial value of n is set as '1' (step S12).

Next, the monitoring device 6 forcedly blocks the output micro flow channel Rc51 in which the parameter n is set as '1' (step S13), and collects the flow rates q51 to q55 of the micro flow meters FM1 to FM5 in this state as reference flow rates q1 to q5 (step S14). In addition, the monitoring device 6 substitutes the standard flow rates q01 to q05 and the reference flow rates q1 to q5 into the following estimation equation (18) to calculate a standard flow rate variation ratio $r_{i,j}(1)$ (step S15). Further, the monitoring device 6 continuously performs a magnitude determination process of the parameter n of step S16 and an increment process of the parameter n of step S17 to obtain the standard flow rate variation ratio $r_{i,j}(n)$ of all of the parameters n from 1 to N (when the output micro flow channels Rc51 to Rc55 are forcedly blocked) and to store the standard flow rate variation ratio in the device 6.

[Mathematical Formula 9]

$$r_{ij}(n) = \frac{q_j - q0_j}{q_i - q0_i} \qquad (18)$$

(In the equation, i and j are numbers of the output micro flow channels, wherein i is 1 and j is 2 to 5, and n is a number of the blocked output micro flow channel.)

Here, the standard flow rate variation ratios $r_{i,j}(1)$ to $r^{i,j}(5)$ that can be obtained by forcedly and sequentially blockage the output micro flow channels (parallel flow channels) Rc51 to Rc55 become different values. The following Table 4 exemplarily shows the flow rate variation ratios $r_{1,5}(1)$ to $r_{1,5}(5)$ of the output micro flow channels Rc51 to Rc55. As shown in Table 4, the flow rate variation ratio $r_{1,5}(n)$ of the output micro flow channels Rc51 and Rc55 becomes different values depending on which of the output micro flow channels (parallel flow channels) Rc51 to Rc55 is blocked.

TABLE 4

| | Blocked flow channel number | | | | |
|---|---|---|---|---|---|
| | R51 | R52 | R53 | R54 | R55 |
| r1, 5 | −0.156 | 0.483 | 1.000 | 2.068 | −6.428 |

In addition, Table 5 shows flow rate measurement values measured at a flow channel for obtaining a standard flow rate variation ratio, which is simply manufactured by joining stainless pipes having an inner diameter of 1 mm. That is, Table 5 shows test results in which flow rates q51 to q55 of pure water flowing through the output micro flow channels (parallel flow channels) Rc51 to Rc55 are measured while an aperture ratio of the valve is gradually varied (states 1 to 10) when the pure water is supplied to the input micro flow channel Rc11 at a flow rate of 20 ml/min, i.e., a linear velocity of 0.42 m/s. Here, State 1 is a state in which no blockage occurs in the flow channels just after the pure water is supplied. While the flow rates of the flow channels are perfectly uniform theoretically, the actual flow rates cannot be perfectly uniform but have a deviation of about 2% due to a manufacturing error, or the like. In this test, it will be appreciated that the flow rate is large like the flow channel adjacent to the blocked flow channel Rc52.

Figure 10A:
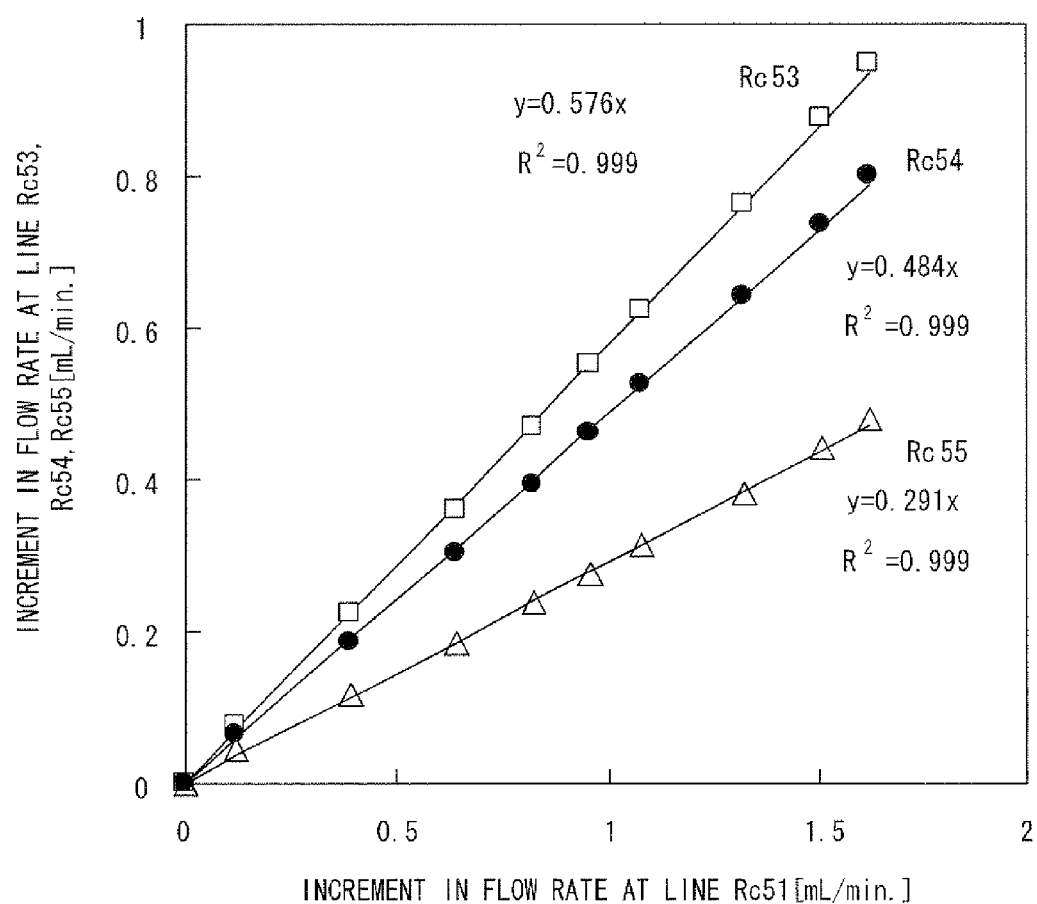
FIG. 10A is a graph showing the relationship between variation in flow rate of an output micro flow channel Rc51 and variations in flow rates of output micro flow channels Rc53 to Rc55 when an output micro flow channel Rc52 is blocked, in the embodiment of the present invention.
Figure 10B:
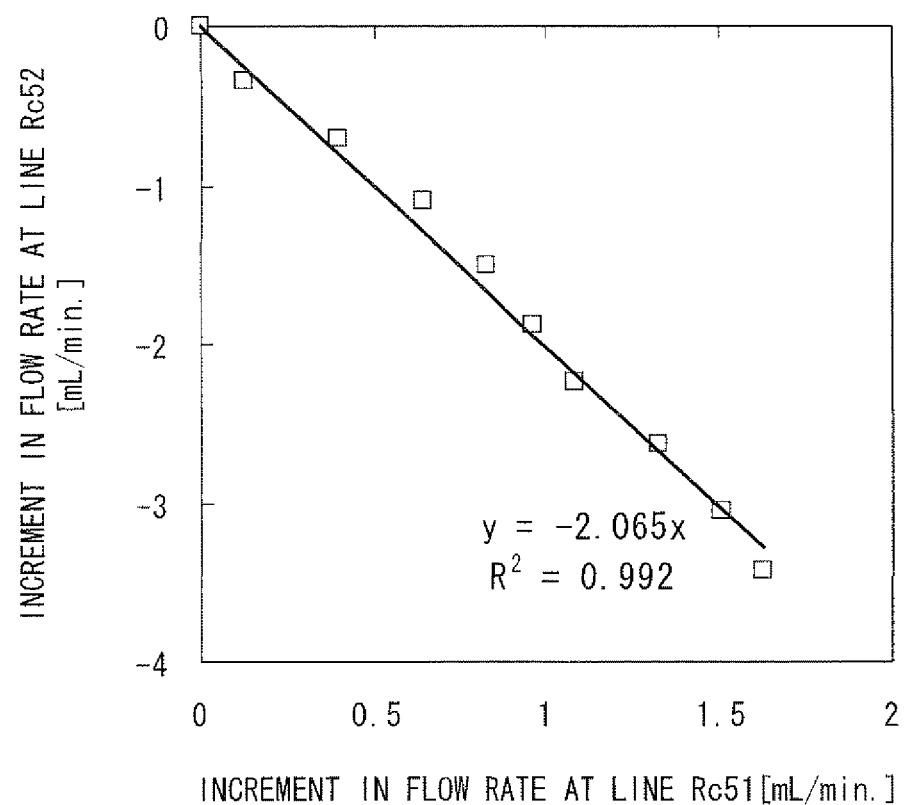
FIG. 10B is a graph showing the relationship between variation in flow rate of the output micro flow channel Rc51 and variation in flow rate of the output micro flow channel Rc52 when the output micro flow channel Rc52 is blocked, in the embodiment of the present invention.

FIG. 10A is a graph showing the relationship between a variation amount in the flow rate (a horizontal axis) of the output micro flow channel Rc51 and variation amounts in the flow rates (a vertical axis) of the output micro flow channels Rc53 to Rc55 when the output micro flow channel Rc52 is blocked. In addition, FIG. 10B is a graph showing the relationship between a variation amount in the flow rate of the output micro flow channel Rc51 and a variation amount in the flow rate of the output micro flow channel Rc52 when the output micro flow channel Rc52 is blocked. FIGS. 10A and 10B use the data of Table 5. As shown in FIG. 10A, when the output micro flow channel Rc52 is blocked, the flow rate variation amounts of the output micro flow channels Rc53, Rc54 and Rc55 linearly vary with respect to the flow rate variation amount of the output micro flow channel Rc51. In addition, as shown in FIG. 10B, when the output micro flow channel Rc52 is blocked, the flow rate variation amount of the output micro flow channel Rc52 also linearly varies with respect to the flow rate variation amount of the output micro flow channel Rc51. Therefore, it will be appreciated that the flow rate variation ratio of two arbitrary output micro flow channels is constant regardless of the blockage level of the output micro flow channel Rc52. Further, the flow rate variation ratio of the two arbitrary output micro flow channels is differentiated as the blocked output micro flow channel changes. Therefore, the blocked flow channel can be specified by obtaining the flow rate variation ratio of the two output flow channels and comparing the flow rate variation ratio with the standard flow rate variation ratio during operation of the micro plant.

TABLE 5

| State | Flow rate | | | | | Total flow rate |
|---|---|---|---|---|---|---|
| | q1 | q2 | q3 | q4 | q5 | mL/min |
| 1 | 3.897 | 3.900 | 3.811 | 3.893 | 3.895 | 19.395 |
| 2 | 4.021 | 3.557 | 3.888 | 3.958 | 3.939 | 19.610 |
| 3 | 4.292 | 3.195 | 4.034 | 4.079 | 4.011 | 19.610 |
| 4 | 4.535 | 2.805 | 4.171 | 4.196 | 4.079 | 19.785 |
| 5 | 4.722 | 2.399 | 4.279 | 4.286 | 4.132 | 19.819 |
| 6 | 4.861 | 2.024 | 4.361 | 4.352 | 4.171 | 19.769 |
| 7 | 4.978 | 1.655 | 4.432 | 4.416 | 4.207 | 19.689 |
| 8 | 5.220 | 1.264 | 4.572 | 4.534 | 4.278 | 19.868 |
| 9 | 5.406 | 0.841 | 4.685 | 4.628 | 4.336 | 19.896 |
| 10 | 5.523 | 0.471 | 4.757 | 4.692 | 4.375 | 19.819 |

*In State 1 reference flow rates q1 to q5 are equal to standard flow rates q01 to q05.

In addition, Table 6 shows variation amounts in the flow rates of the output micro flow channels Rc51 and Rc55 when aperture ratios of the flow rate control valves V2 to V4 are gradually varied, i.e., when blockage levels of the output micro flow channels Rc52 to Rc54 are gradually varied. Further, in Table 6, State 10 shows a state in which the flow rate control valves V2 and V3 are completely closed, i.e., a state in which the output micro flow channels Rc52 and Rc53 are completely blocked.

Figure 11:
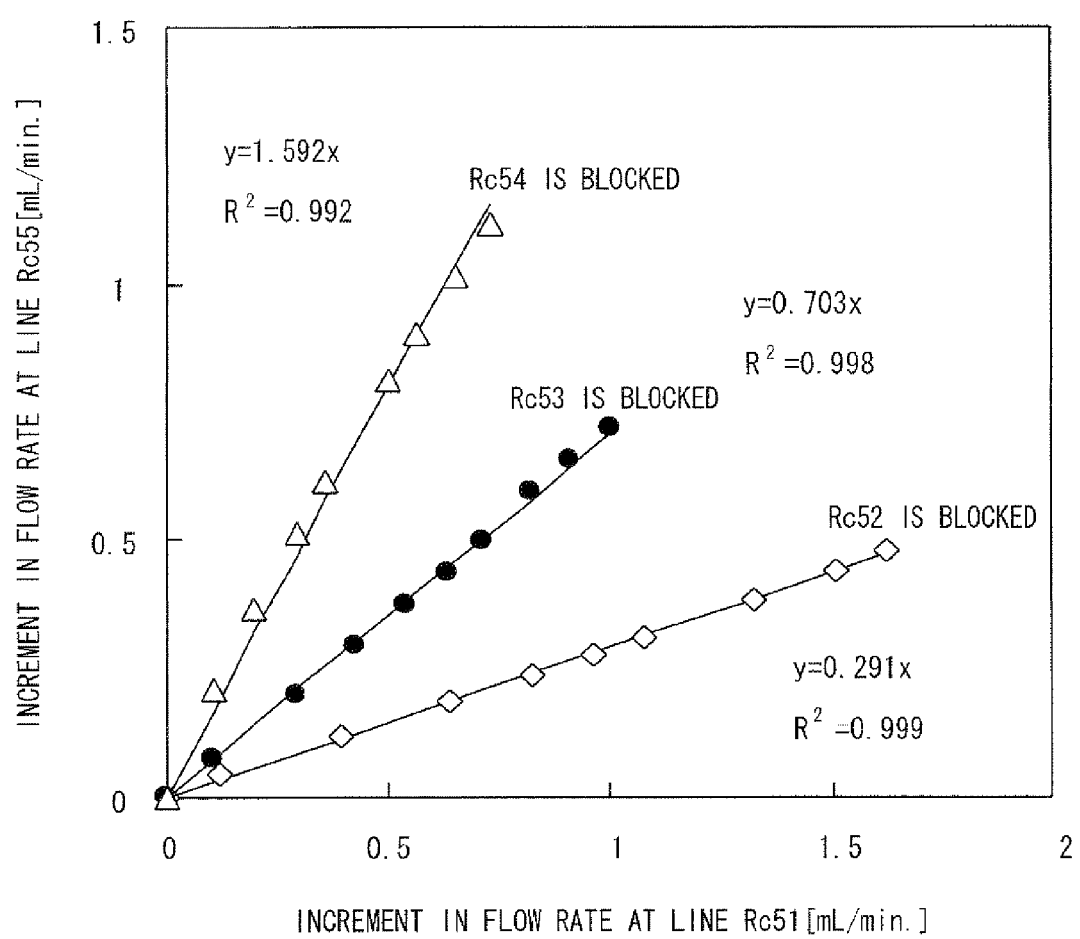
FIG. 11 is a graph showing the relationship between variation in flow rate of the output micro flow channel Rc51 and variation in flow rate of the output micro flow channel Rc55 when the output micro flow channels Rc52 to Rc54 are blocked, in the embodiment of the present invention.

FIG. 11 is a graph showing the relationship between a variation amount in the flow rate of the output micro flow channel Rc51 and a variation amount in the flow rate of the output micro flow channel Rc55 when blockage levels of the output micro flow channels Rc52, Rc53 and Rc54 are gradually varied. FIG. 11 uses the data of Table 6. As shown in FIG. 11, when the blockage levels of the output micro flow channels Rc52, Rc53 and Rc54 are gradually varied, the flow rate variation amount of the output micro flow channel Rc55 linearly varies with respect to the flow rate variation amount of the output micro flow channel Rc51. That is, the ratio between the flow rate variation amount of the output micro flow channel Rc55 and the flow rate variation amount of the output micro flow channel Rc51, i.e., the standard flow rate variation ratios $r_{1,5}(2)$, $r_{1,5}(3)$ and and $r_{1,5}(4)$, were constant regardless of the blockage levels of the output micro flow channels. In addition, it will be appreciated that values of the ratios $r_{1,5}(2)$, $r_{1,5}(3)$ and $r_{1,5}(4)$ are different from each other, and thus, the standard flow rate variation ratio $r_{1,5}(n)$ is differentiated by the blocked output micro flow channel.

TABLE 6

| Blocked flow channel Rc52 | | | Blocked flow channel Rc53 | | | Blocked flow channel Rc54 | | |
|---|---|---|---|---|---|---|---|---|
| | Variation amount in flow rate [mL/min] | | | Variation amount in flow rate [mL/min] | | | Variation amount in flow rate [mL/min] | |
| State | q1-q01 | q5-q05 | State | q1-q01 | q5-q05 | State | q1-q01 | q5-q05 |
| 1 | 0.000 | 0.000 | 1 | 0.000 | 0.000 | 1 | 0.000 | 0.000 |
| 2 | 0.124 | 0.044 | 2 | 0.104 | 0.076 | 2 | 0.103 | 0.206 |
| 3 | 0.395 | 0.116 | 3 | 0.301 | 0.200 | 3 | 0.202 | 0.368 |
| 4 | 0.638 | 0.184 | 4 | 0.433 | 0.294 | 4 | 0.295 | 0.511 |
| 5 | 0.825 | 0.237 | 5 | 0.547 | 0.375 | 5 | 0.364 | 0.613 |
| 6 | 0.964 | 0.276 | 6 | 0.640 | 0.436 | 6 | 0.503 | 0.810 |
| 7 | 1.081 | 0.312 | 7 | 0.713 | 0.494 | 7 | 0.566 | 0.902 |
| 8 | 1.323 | 0.384 | 8 | 0.822 | 0.594 | 8 | 0.653 | 1.017 |
| 9 | 1.509 | 0.441 | 9 | 0.912 | 0.652 | 9 | 0.727 | 1.119 |
| 10 | 1.626 | 0.480 | 10 | 1.007 | 0.714 | | — | |

Figure 12:
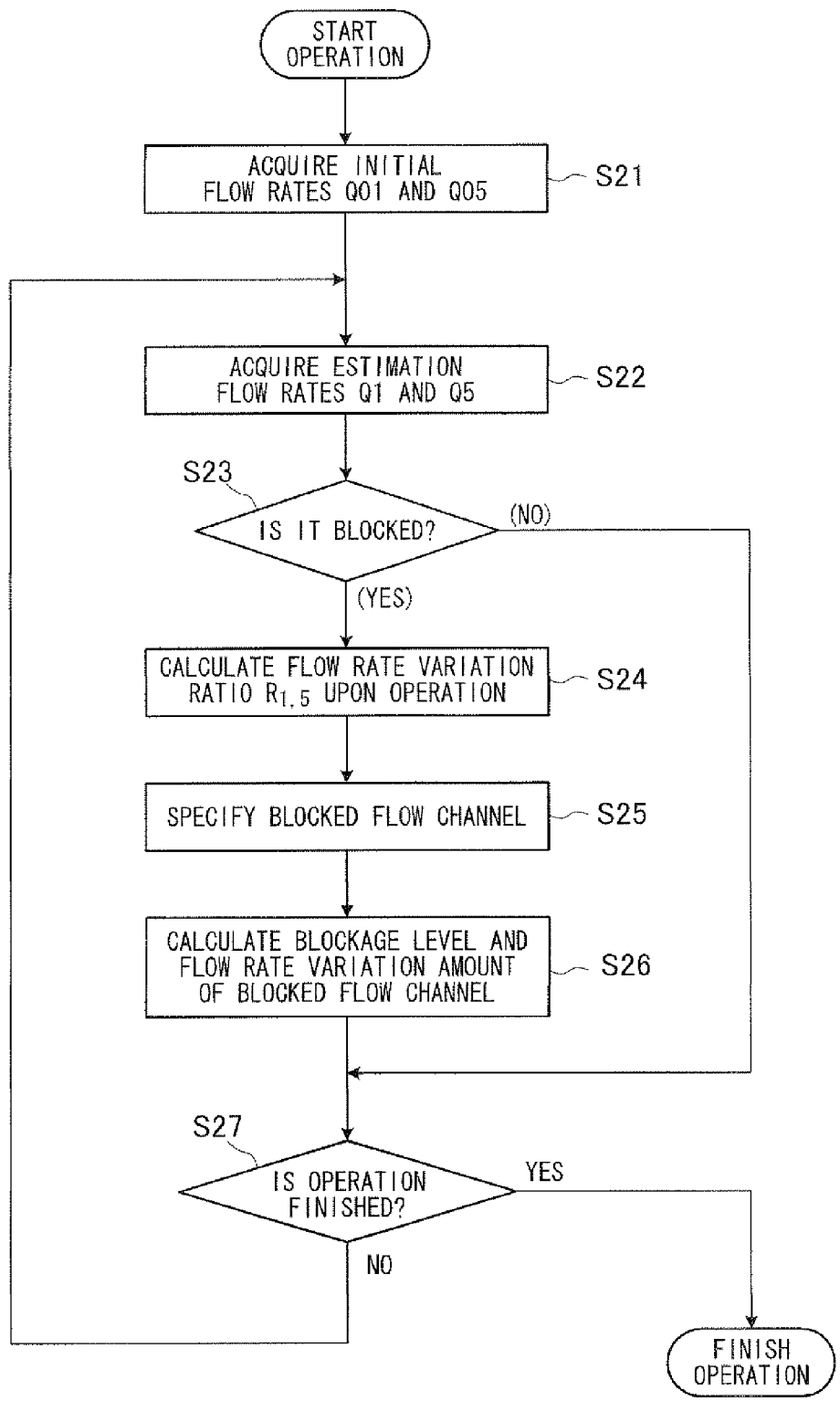
FIG. 12 is a flowchart showing a blockage determination process in accordance with the embodiment of the present invention.

FIG. 12 is a flowchart showing the blockage determination process (step S2) in detail. In the blockage determination process, the monitoring device 6 obtains the flow rates q51 and q55 of the micro flow meters FM1 and FM5 as initial flow rates Q01 and Q05 right after an operation of the micro plant starts (step S21), and after a predetermined time elapses, obtains the flow rates q51 and q55 of the micro flow meters FM1 and FM5 as estimation flow rates Q1 and Q5 (step S22). In addition, the monitoring device 6 determines whether any one of the output micro flow channels Rc51 to Rc55 is blocked or not, by substituting the initial flow rates Q01 and Q05 and the estimation flow rates Q1 and Q5 into the following determination equations (19) and (20) (step S23).

[Mathematical Formula 10]

$$|Q1-Q01|>\epsilon_1 \qquad (19)$$

$$|Q5-Q05|>\epsilon_5 \qquad (20)$$

That is, the monitoring device 6 determines that any one of the output micro flow channels Rc51 to Rc55 is blocked when the absolute value of the difference between the initial flow rate Q01 and the estimation flow rate Q1 of the output micro flow channel Rc51 is larger than a predetermined threshold value ∈1 and/or when the absolute value of the difference between the initial flow rate Q05 and the estimation flow rate Q5 of the output micro flow channel Rc55 is larger than a predetermined threshold value δ5.

In addition, the monitoring device 6 calculates a flow rate variation ratio $R_{1,5}$ upon operation based on the following estimation equation (18-1) when it is determined that there is blockage (step S24), and specifies the parameter n of the actually blocked output micro flow channel (blocked flow channel), i.e., the corresponding blocked flow channel, by comparing the flow rate variation ratio upon operation $R_{1,5}$ with the standard flow rate variation ratio $r_{1,5}(n)$ pre-stored in the monitoring device 6 (step S25).

[Mathematical Formula 11]

$$R_{1,5} = \frac{Q5 - Q05}{Q1 - Q01} \quad (18\text{-}1)$$

The monitoring device 6 calculates a blockage level of the corresponding blocked flow channel when the parameter n of the blocked flow channel is specified (step S26). That is, the monitoring device 6 calculates a flow rate variation $\Delta Q(n)$ of the blocked flow channel by substituting the standard flow rate variation ratio $r_{1,n}(n)$ of the blocked flow channel and the output micro flow channel Rc51 and the initial flow rate Q01 and the estimation flow rate Q1 obtained in steps S21 and S22 into the following flow rate variation equation (21). In addition, the monitoring device 6 calculates a blockage level of the blocked flow channel by substituting the standard flow rate variation ratio $r_{1,n}(n)$ between the blocked flow channel and the output micro flow channel Rc51 and the initial flow rate Q01 and the estimation flow rate Q1 obtained in steps S21 and S22 into the following blockage level calculation equation (22). The blockage level calculation equation (22) shows a blockage level B(n) obtained by the product of a flow rate variation rate obtained by the initial flow rate and the estimation flow rate and the standard flow rate variation ratio $r_{1,n}(n)$ of the blocked flow channel and the output micro flow channel Rc51.

[Mathematical Formula 12]

<<Flow Rate Variation Equation of Blocked Flow Channel>>

$$\Delta Q(n) = r_{1,n}(n) \times (Q1 - Q01) \quad (21)$$

[Mathematical Formula 13]

<<Blockage Level Calculation Equation>>

$$\Delta B(n) = r_{1,n}(n) \times \frac{(Q1 - Q01)}{Q01} \quad (22)$$

Table 7 shows the standard flow rate variation ratio $r_{i,j}(n)$ that can be obtained by substituting the calculation results of Table 6 into the equation (18). Table 8 shows results of the flow rate variation ratio $R_{1,5}$ upon operation, and the flow rate variation $\Delta Q(n)$ and the blockage level B(n) of the blocked flow channel by substituting the calculation results of Table 5 into the equation (18-1), the flow rate variation equation (21) and the blockage level calculation equation (22). The flow rate variation ratio $R_{1,5}$ upon operation was calculated by providing State 1 as the initial flow rates Q01 and Q05.

Since the flow rate variation ratio $R_{1,5}$ upon operation of Table 8 is substantially the same as $r_{1,5}(2)$ of Table 7, the blocked flow channel in this embodiment can be determined as n=2. The flow rate variation $\Delta Q(n)$ and the blockage level B(n) of the blocked flow channel were calculated using $r_{1,2}(2) = -2.011$.

As shown in Table 8, since the flow rate variation amount $\Delta Q(n)$ and the blockage level B(n) of the blocked flow channel Rc52 that can be obtained by substituting the initial flow rate Q01 of the output micro flow channel Rc51, the estimation flow rate Q1 of the output micro flow channel Rc51 and the standard flow rate variation ratio $r_{1,2}(2)$ of the blocked flow rate into the equations (21) and (22) are substantially equal to each other, in comparison with the flow rate variation amount and the blockage level that can be obtained by an actual measured value of the micro flow meter FM2, the blocked state of the micro plant P can be substantially observed.

TABLE 7

| Blocked flow channel | Standard flow rate variation ratio | | | |
|---|---|---|---|---|
| n | r1, 2(n) | r1, 3(n) | r1, 4(n) | r1, 5(n) |
| 2 | −2.011 | 0.576 | 0.484 | 0.291 |
| 3 | 1.095 | −3.240 | 1.205 | 0.703 |
| 4 | 0.968 | 1.445 | −4.455 | 1.592 |

TABLE 8

| | Flow rate, mL/min | | | Flow rate variation ratio upon operation | Flow rate variation, mL/min | | Flow rate variation, % | |
|---|---|---|---|---|---|---|---|---|
| State | Q1 | Q2 | Q5 | R1, 5 | Actual measured value | Equation (22) | Actual measured value | Equation (23) |
| 1 | 3.897 | 3.900 | 3.895 | | 0.000 | 0.000 | 0.0% | 0.0% |
| 2 | 4.021 | 3.557 | 3.939 | 0.355 | −0.343 | −0.249 | −8.8% | −6.4% |
| 3 | 4.292 | 3.195 | 4.011 | 0.294 | −0.705 | −0.794 | −18.1% | −20.4% |
| 4 | 4.535 | 2.805 | 4.079 | 0.288 | −1.095 | −1.283 | −28.1% | −32.9% |
| 5 | 4.722 | 2.399 | 4.132 | 0.287 | −1.501 | −1.659 | −38.5% | −42.6% |
| 6 | 4.861 | 2.024 | 4.171 | 0.286 | −1.876 | −1.939 | −48.1% | −49.7% |
| 7 | 4.978 | 1.655 | 4.207 | 0.289 | −2.245 | −2.174 | −57.6% | −55.8% |
| 8 | 5.220 | 1.264 | 4.278 | 0.289 | −2.636 | −2.661 | −67.6% | −68.3% |
| 9 | 5.406 | 0.841 | 4.336 | 0.292 | −3.059 | −3.035 | −78.4% | −77.9% |
| 10 | 5.523 | 0.471 | 4.375 | 0.295 | −3.429 | −3.270 | −87.9% | −83.9% |

When the blockage level is calculated as described above, the monitoring device 6 determines whether the micro plant is continuously operated (step S27). When the operation is continuously performed, the monitoring device 6 specifies the blocked flow channel and periodically calculates the flow rate variation amount $\Delta Q(n)$ and the blockage level B(n) of the blocked flow channel by repeating the processes of steps S22 to S26, and when the operation is completed, the monitoring device 6 completes the monitoring process.

In addition, while the blockage determination process (step S2) shown in FIG. 12 requires the flow rate variation amount ΔQ(n) and the blockage level B(n) in addition to specifying the blocked flow channel, when there is no need to acquire the blockage level B(n), the process of step S26 may be omitted, and simultaneously, only the initial flow rate variation ratios $r_{1,5}(1)$ to $r_{1,5}(5)$ of the two output micro flow channels Rc51 and Rc55 may be required with respect to the initial flow rate data acquisition process (step S1) shown in FIG. 9. Therefore, in this case, a structure in which the micro flow meters FM1 and FM5 are installed as the flow channels for initial flow rate data acquisition at only the two output micro flow channels Rc51 and Rc55, i.e., the micro flow meters FM2 to FM4 installed at the output micro flow channels Rc52 to Rc54 are omitted, may be used.

Further, while the flow rate variation amount ΔQ(n) and the blockage level B(n) are calculated in the blockage determination process (step S2) shown in FIG. 12 only when the blockage is detected through step S23, the blockage levels of the output micro flow channels Rc51 to Rc55 may be periodically calculated, regardless of the presence of blockage. In this case, since it is possible to detect a blockage sign at a step before any one of the output micro flow channels Rc51 to Rc55 is completely blocked, the micro plant P can be stably operated.

INDUSTRIAL APPLICABILITY

According to the above-mentioned embodiment, the following effects may be provided.

(1) Since the micro fluid distribution device M is designed based on a combination of the fluid bifurcation portions B11 to B44 and the fluid junction portions G21 to G43 and the pressure drop compartment connection model including the fluid balance equations (1) to (14) and the pressure balance equations (15) to (17), uniform distribution of the processing fluid W supplied to the input micro flow channel Rc11 into the output micro flow channels Rc51 to Rc55 can be achieved through a simple structure. In addition, since the uniform distribution has robustness, the uniform distribution can be maintained even when the flow rate of the processing fluid W supplied to the input micro flow channel Rc11 is varied.

(2) According to the blockage detection method of the output micro flow channels (parallel flow channels) Rc51 to Rc55 in this embodiment, since it is possible to specify which of the output micro flow channels Rc51 to Rc55 is blocked by installing the micro flow meters FM1 and FM5 at two arbitrary output micro flow channels Rc51 and Rc55 of the output micro flow channels (parallel flow channels) Rc51 to Rc55 of the actual micro plant P, the blocked flow channel can be specified using a smaller number of micro flow meters than that of the conventional art.

(3) According to the blockage detection method of the output micro flow channels (parallel flow channels) Rc51 to Rc55 in this embodiment, since it is possible to specify which one of the output micro flow channels Rc51 to Rc55 is blocked by installing the micro flow meters FM1 and FM5 at two arbitrary output micro flow channels Rc51 and Rc55 of the output micro flow channels (parallel flow channels) Rc51 to Rc55 of the actual micro plant P, the blockage level of the blocked flow channel can be specified using a smaller number of micro flow meters than that of the conventional art, thereby providing advantages to industries.

The invention claimed is:

1. A fluid distribution device, comprising
an input flow channel,
at least three fluid bifurcation portions that distribute a fluid input from the input flow channel into at least three fluids, and
at least one fluid converging portion that joins the fluids distributed by the fluid bifurcation portions together, wherein
the bifurcation portions are formed by combining branch micro flow channels that are perpendicular to the input flow channel and branch micro flow channels that are parallel to the input flow channel,
the input flow channel is bifurcated into two branch micro flow channels that are parallel to the input flow channel through two branch microflow channels that are perpendicular to the input flow channel,
flow channel lengths, cross-sectional areas and hydraulic equivalent diameters of the branch micro flow channels that are perpendicular to the input flow channel are the same,
flow channel lengths, cross-sectional areas and hydraulic equivalent diameters of the branch micro flow channels that are parallel to the input flow channel are the same, and
the fluid distribution device is configured to correspond to a pressure drop compartment connection model composed of a fluid balance equation and a pressure balance equation.

2. The fluid distribution device according to claim 1, wherein the fluid distribution device is finely configured for the use of a micro plant having a numbering-up structure.

3. A micro plant, which uniformly distributes a processing fluid into microprocessing devices through the fluid distribution device according to claim 2.

4. A fluid distribution device for uniformly distributing and outputting a fluid, which is supplied to an input flow channel, into at least three output flow channels, comprising
a plurality of branch flow channels,
at least three fluid bifurcation portions,
at least one fluid converging portion,
a monitoring device for monitoring blockage of the output flow channels, and
two flow meters installed at two arbitrary output flow channels of each of the output flow channels, wherein
the fluid distribution device is configured to correspond to a pressure drop compartment connection model composed of a fluid balance equation and a pressure balance equation,
the monitoring device performs a pre-process of acquiring values measured by the flow meters as a standard flow rate in a state in which there is no blockage in the entire output flow channels, acquiring values measured by the flow meters as a reference flow rate when the output flow channels in which the flow meters are not installed are blocked, and storing the ratio of the difference between the standard flow rate and the reference flow rate of one flow meter and the difference between the standard flow rate and the reference flow rate of the other flow meter as a standard flow rate variation ratio,
during an operation after the pre-process, the monitoring device acquires values measured by the flow meters as an initial flow rate right after the operation starts, then acquires values measured by the flow meters as an estimation flow rate, and calculates the ratio of the difference between the initial flow rate and the estimation flow rate of one flow meter and the difference between the initial flow rate and the estimation flow rate of the other flow meter as a flow rate variation ratio upon operation, and the monitoring device specifies a blocked output flow channel based on a comparison of the flow rate variation ratio upon operation with the standard flow rate variation ratio.

5. fluid distribution device for uniformly distributing and outputting a fluid, which is supplied to an input flow channel, tino at least three output flow channels, comprising
  a plurality of branch flow channels,
  at least three fluid bifurcation portions,
  at least one fluid converging portion,
  a monitoring device for monitoring blockage of the output flow channels, and
  two flow meters installed at two arbitrary output flow channels of each of the output flow channels, wherein
  the fluid distribution device is configured to correspond to a pressure drop compartment connection model composed of a fluid balance equation and a pressure balance equation,
  the monitoring device performs a pre-process of acquiring values of the flow meters as a standard flow rate in a state in which there is no blockage in the entire output flow channels, all of which are installed with flow meters, sequentially acquiring values measured by the flow meters as a reference flow rate when the output flow channels are sequentially blocked, and storing the ratio of the difference between the standard flow rate and the reference flow rate of each flow meter and the difference between the standard flow rate and the reference flow rate of the other flow meter as a standard flow rate variation ratio, and
  during an operation after the pre-process, the monitoring device acquires values measured by the flow meters as an initial flow rate right after the operation starts, then acquires values measured by the flow meters as an estimation flow rate, and detects blockage levels of the output flow channels based on the product of a flow rate variation rate and the standard flow rate variation ratio, the flow rate variation rate being obtained from the initial flow rate and the estimation flow rate.

6. The fluid distribution device according to claim 5, wherein the monitoring device detects a blockage level of the blocked output flow channel when the blocked output flow channel is specified.

7. A method of designing a fluid distribution device, comprising
  designing the fluid distribution device with a configuration including an input flow channel, at least three fluid bifurcation portions that distribute a fluid inputted from the input flow channel into at least three fluids, and at least one fluid converging portion that joins the fluids distributed by the fluid bifurcation portions together, and
  applying a pressure drop compartment connection model composed of a fluid balance equation and a pressure balance equation to the fluid distribution device, wherein
  the bifurcation portions are formed by combining branch micro flow channels that are perpendicular to the input flow channel and branch micro flow channels that are parallel to the input flow channel,
  the input flow channel is bifurcated into two branch flow channels that are parallel to the input flow channel through two branch micro flow channels that are perpendicular to the input flow channel,
  flow channel lengths, cross-sectional areas and hydraulic equivalent diameters of the branch micro flow channels that are perpendicular to the input flow channel are the same, and
  flow channel lengths, cross-sectional areas and hydraulic equivalent diameters of the branch micro flow channels that are parallel to the input flow channel are the same.

8. A method of detecting blockage of flow channels of a fluid distribution device designed by a design method comprising
  a pre-process of acquiring flow rates of two arbitrary output flow channels as a standard flow rate in a state in which there is no blockage in the entire output flow channels, acquiring flow rates of the two output flow channels as a reference flow rate when the output flow channels other than the two output flow channels are blocked, and storing the ratio of the difference between the standard flow rate and the reference flow rate of a flow meter installed at one of the two output flow channels and the difference between the standard flow rate and the reference flow rate of a flow meter installed at the other flow channel as a standard flow rate variation ratio,
  during an operation after the pre-process, acquiring flow rates of the two output flow channels as an initial flow rate right after the operation of the fluid distribution device starts, then acquiring flow rates of the two output flow channels as an estimation flow rate, and calculating the ratio of the difference between an initial flow rate and an estimation flow rate of a flow meter installed at one of the two output flow channels and the difference between an initial flow rate and an estimation flow rate of a flow meter installed at the other flow channel as a flow rate variation ratio upon operation, and
  specifying the blocked output flow channel based on a comparison of the flow rate variation ratio upon operation with the standard flow rate variation ratio, wherein
  the design method includes designing the fluid distribution device with a configuration including at least three fluid bifurcation portions and at least on fluid converging portion by combining a plurality of branch flow channels, and
  applying a pressure drop compartment connection model composed of a fluid balance equation and a pressure balance equation to the fluid distribution device.

9. The method according to claim 8, which is applied to the fluid distribution device finely configured for the use of a micro plant having a numbering-up structure.

10. A method of detecting blockage of flow channels of a fluid distribution device designed by a design method comprising
  a pre-process of acquiring flow rates of the entire output flow channels as a standard flow rate in a state in which there is no blockage in the entire output flow channels, acquiring flow rates of the entire output flow channels as a reference flow rate when the output flow channels are sequentially blocked, and storing the ratio of the difference between the standard flow rate and the reference flow rate of each output flow channel and the difference between the standard flow rate and the reference flow rate of the other output flow channel as a standard flow rate variation ratio, and
  during an operation after the pre-process, acquiring flow rates of two arbitrary output flow channels as an initial flow rate right after the operation of the fluid distribution device starts, then acquiring flow rates of the two output flow channels as an estimation flow rate, and detecting a blockage level of the output flow channels based on the product of a flow rate variation rate and the standard flow rate variation ratio, the flow rate variation rate being obtained from the initial flow rate and the estimation flow rate, wherein the design method includes designing the fluid distribution device with a configuration including at least three fluid bifurcation portions and at least one fluid converging portion by combining a plurality of branch flow channels, and applying a pressure drop compartment connection model composed of a fluid balance equation and a pressure balance equation to the fluid distribution device.

11. The method according to claim 10, which is applied to the fluid distribution device finely configured for the use of a micro plant having a numbering-up structure.

* * * * *